(12) United States Patent
Yang et al.

(10) Patent No.: US 12,096,400 B2
(45) Date of Patent: Sep. 17, 2024

(54) RESOURCE ALLOCATION FOR SIDELINK DISCOVERY

(71) Applicant: QUALCOMM Incorporated, San Diego, CA (US)

(72) Inventors: Wei Yang, San Diego, CA (US); Seyedkianoush Hosseini, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 462 days.

(21) Appl. No.: 17/478,567

(22) Filed: Sep. 17, 2021

(65) Prior Publication Data

US 2022/0104180 A1 Mar. 31, 2022

Related U.S. Application Data

(60) Provisional application No. 63/083,749, filed on Sep. 25, 2020.

(51) Int. Cl.
| | |
|---|---|
| *H04W 72/02* | (2009.01) |
| *H04L 1/1812* | (2023.01) |
| *H04W 24/08* | (2009.01) |
| *H04W 72/1263* | (2023.01) |
| *H04W 76/28* | (2018.01) |

(52) U.S. Cl.
CPC ........... *H04W 72/02* (2013.01); *H04L 1/1819* (2013.01); *H04W 24/08* (2013.01); *H04W 72/1263* (2013.01); *H04W 76/28* (2018.02)

(58) Field of Classification Search
CPC . H04W 72/02; H04W 24/08; H04W 72/1263; H04W 76/28; H04W 76/14; H04W 92/18; H04W 8/005; H04L 1/1819; H04L 1/1893; H04L 2001/0092;
(Continued)

(56) References Cited

U.S. PATENT DOCUMENTS

| 2016/0249198 A1 | 8/2016 | Kim et al. |
| 2017/0215154 A1* | 7/2017 | Kim .................... H04B 17/318 |

(Continued)

FOREIGN PATENT DOCUMENTS

| WO | 2017171897 A1 | 10/2017 | |
| WO | WO-2018071517 A1 * | 4/2018 | ............ H04W 8/005 |

OTHER PUBLICATIONS

International Search Report and Written Opinion—PCT/US2021/051051—ISA/EPO—Jan. 14, 2022.
(Continued)

*Primary Examiner* — Ayanah S George
(74) *Attorney, Agent, or Firm* — Procopio, Cory, Hargreaves & Savitch LLP

(57) ABSTRACT

Aspects presented herein may improve the resource allocation of sidelink communications and reduce power consumption for sidelink devices. In one aspect, a first wireless device selects a resource for a discovery message from a sidelink resource pool that is partitioned into a first portion and a second portion. The first wireless device transmits a discovery message to a second wireless device using the resource selected from the first portion of the sidelink resource pool. The first wireless device monitor for a discovery response message from the second wireless device in the sidelink resource pool.

30 Claims, 16 Drawing Sheets

(58) Field of Classification Search
CPC ..... H04L 5/0094; H04L 5/005; H04L 5/0053; Y02D 30/70
See application file for complete search history.

(56) References Cited

U.S. PATENT DOCUMENTS

2021/0297842 A1* 9/2021 Shrivastava .......... H04W 28/24
2022/0330038 A1* 10/2022 Ganesan ............. H04W 72/046

OTHER PUBLICATIONS

NEC: "D2D Discovery Resource Allocation Under Network Coverage", 3GPP Draft, 3GPP TSG RAN WG1 Meeting #76, R1-140494_D2D_Discovery_Resource_Allocation, 3rd Generation Partnership Project (3GPP), Mobile Competence Centre, vol. RAN WG1, No. Prague, Czech Republic, Feb. 10, 2014-Feb. 14, 2014 Feb. 9, 2014, XP050736027, 3 Pages, Retrieved from Internet: URL: http://www.3gpp.org/ftp/Meetings_3GPP_SYNC/RAN/RAN1/Docs/ [retrieved on Feb. 9, 2014] Section 2 Figure 1.

* cited by examiner

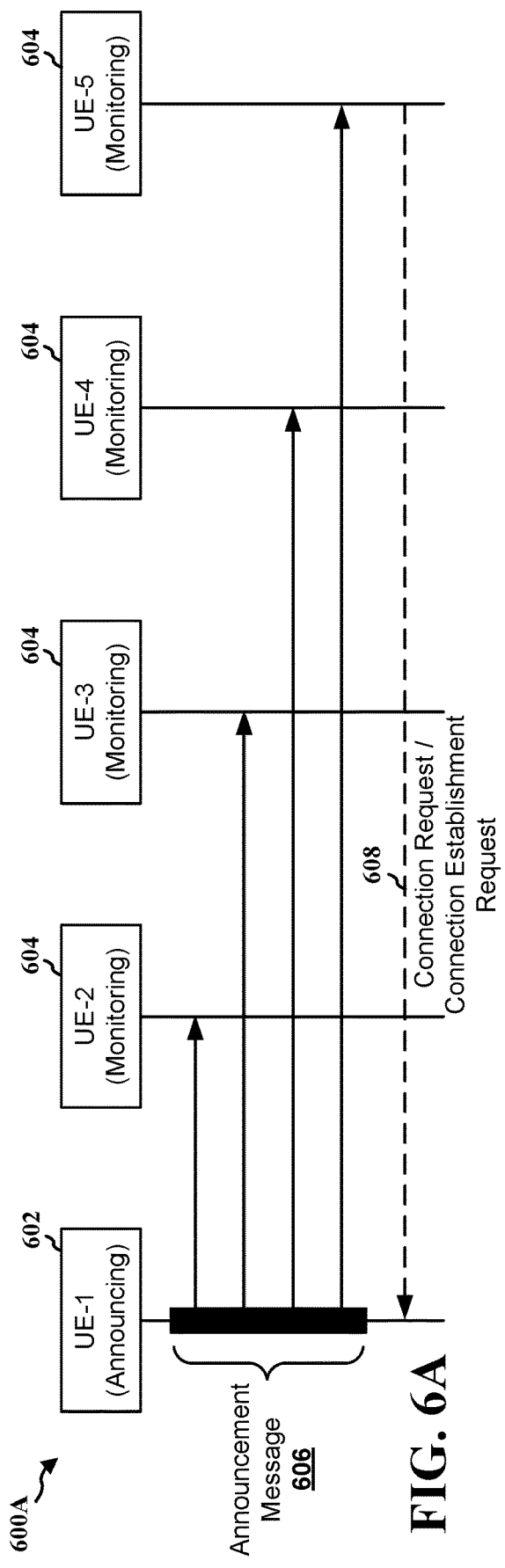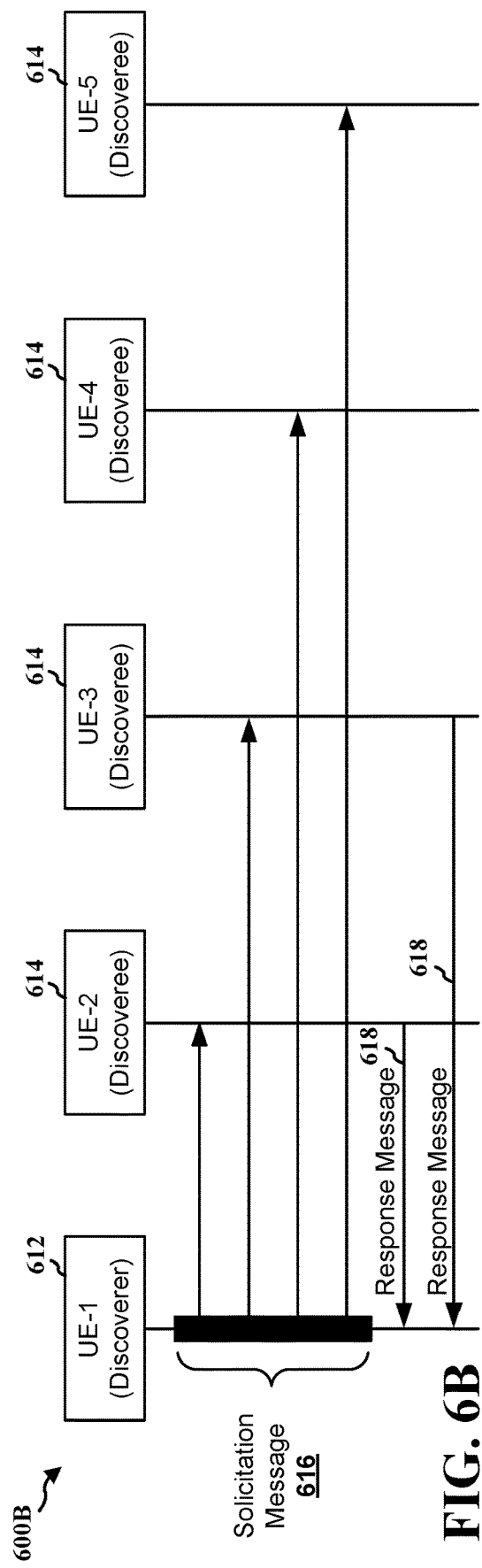

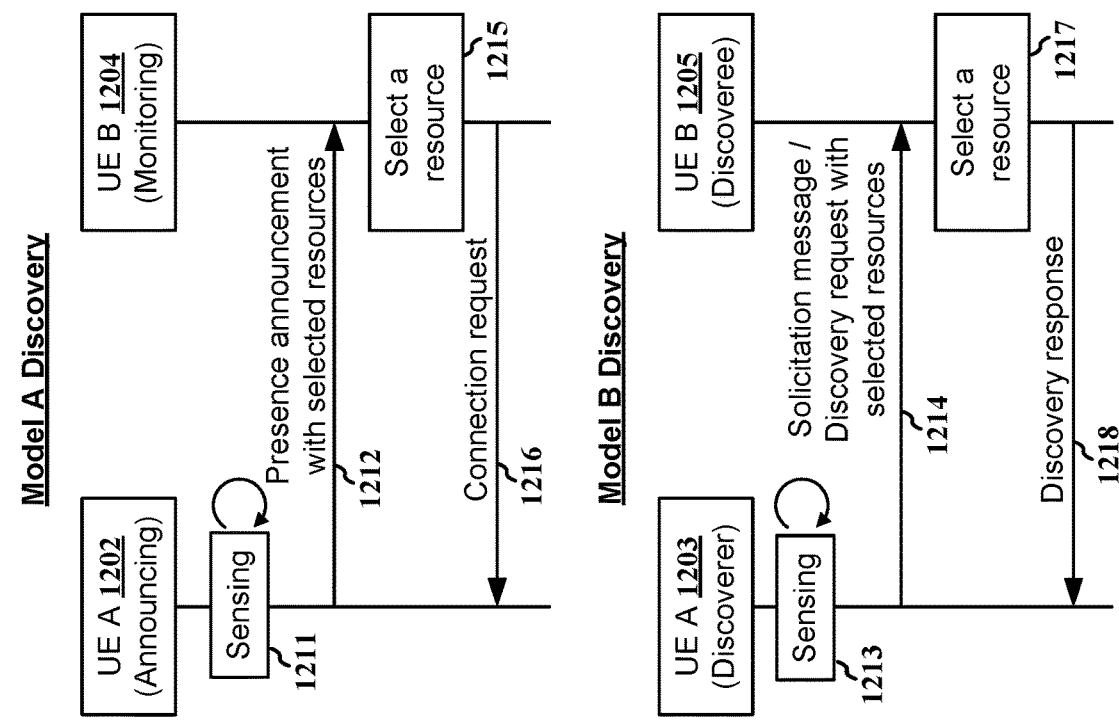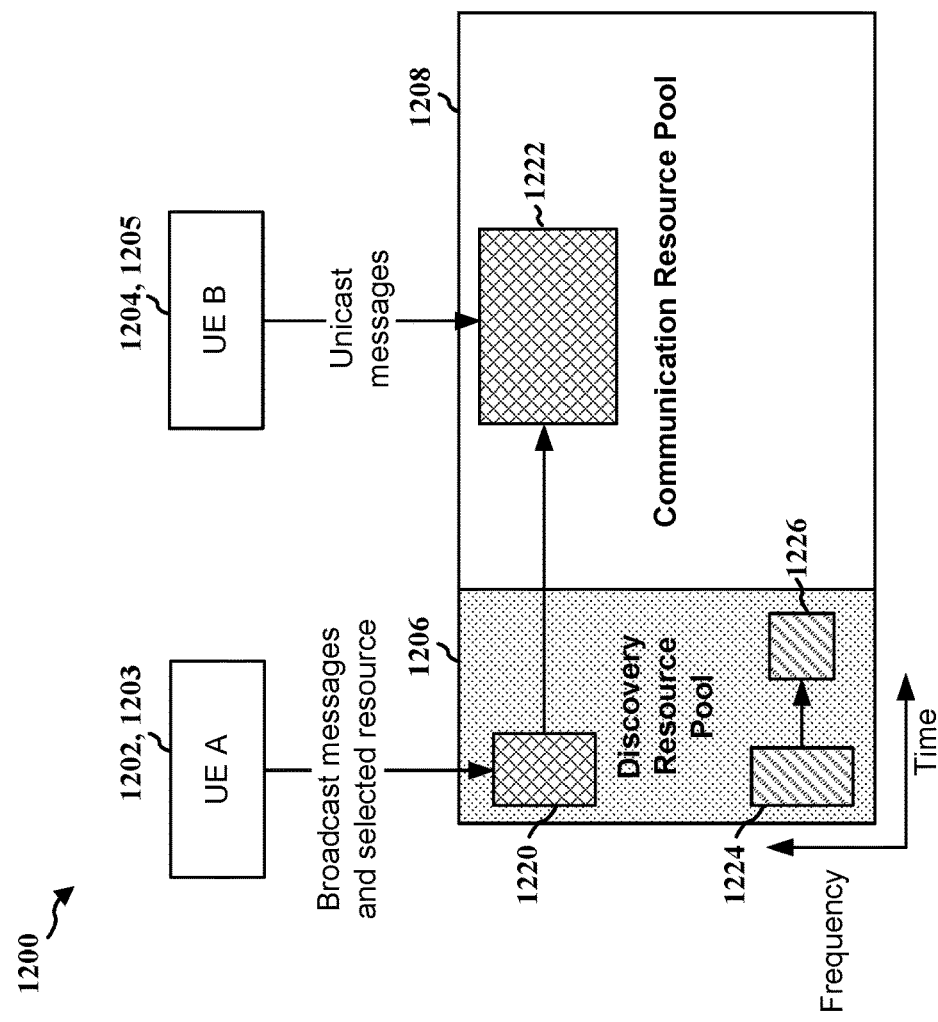
FIG. 12

RESOURCE ALLOCATION FOR SIDELINK DISCOVERY

CROSS REFERENCE TO RELATED APPLICATION(S)

This application claims the benefit of and priority to U.S. Provisional Application Ser. No. 63/083,749, entitled "RESOURCE ALLOCATION FOR SIDELINK DISCOVERY" and filed on Sep. 25, 2020, which is expressly incorporated by reference herein in its entirety.

TECHNICAL FIELD

The present disclosure relates generally to communication systems, and more particularly, to sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first wireless device. The apparatus may select a resource for a discovery message from a sidelink resource pool that is partitioned into a first portion and a second portion. The apparatus may also transmit a discovery message to a second wireless device using the resource selected from the first portion of the sidelink resource pool. The apparatus may also monitor for a discovery response message from the second wireless device in the sidelink resource pool.

In an aspect of the disclosure, a method, a computer-readable medium, and an apparatus are provided for wireless communication at a first wireless device. The apparatus may monitor for a discovery message in a first portion of a sidelink resource pool, where the sidelink resource pool may be partitioned into the first portion and a second portion. The apparatus may receive the discovery message in the first portion of the sidelink resource pool from a second wireless device. The apparatus may transmit a discovery response message or a connection establishment request message to the first wireless device in the sidelink resource pool.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A and 6B are communication flows illustrating examples of sidelink discovery.

FIG. 12 is a diagram illustrating an example of sidelink discovery and resource allocation.

DETAILED DESCRIPTION

Figure 1:
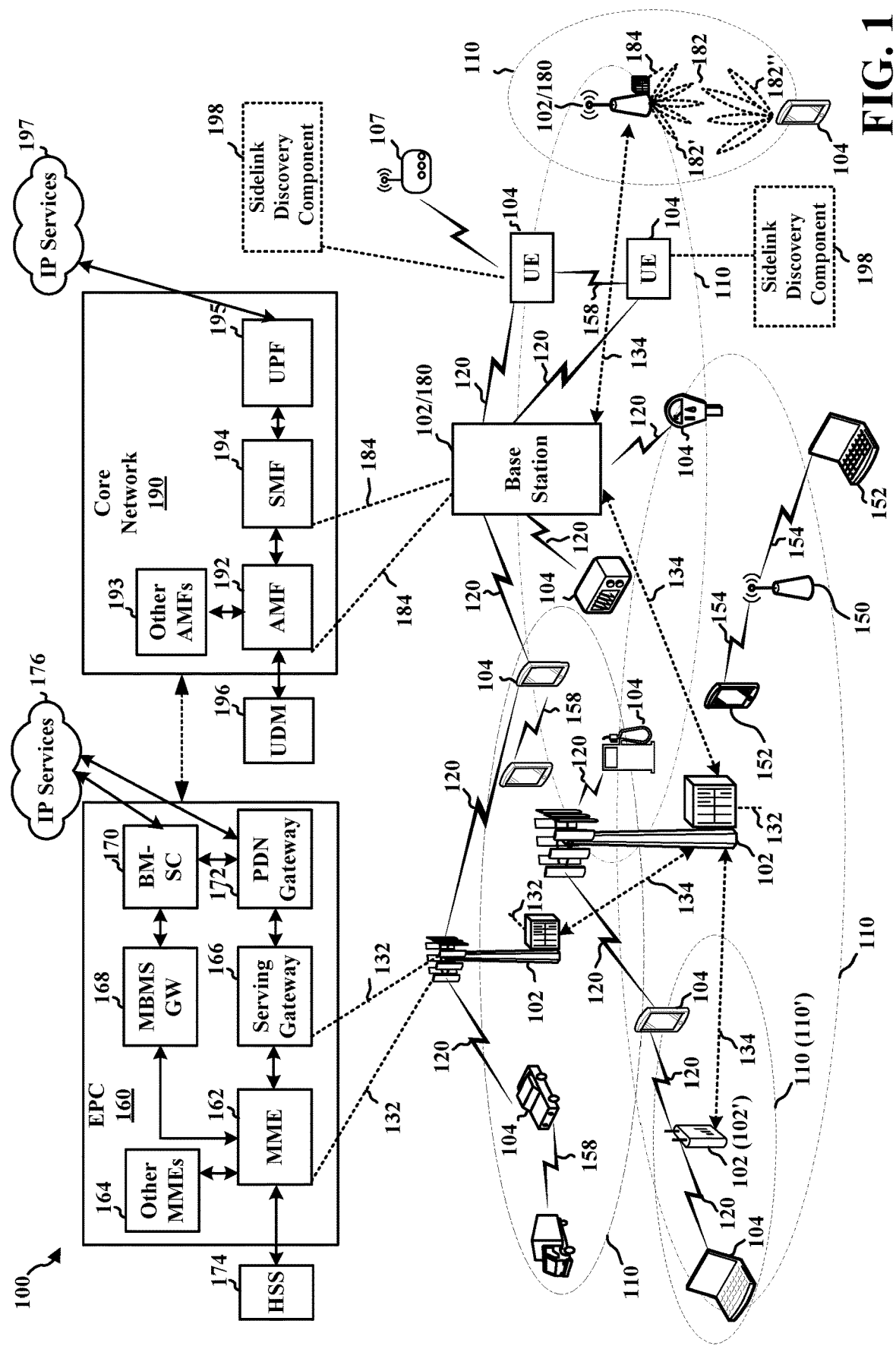
FIG. 1 is a diagram illustrating an example of a wireless communications system and an access network.

Sidelink communication may include direct wireless communication between a first device (e.g., a first UE or other sidelink device) and a second device (e.g., a second UE or other sidelink device), e.g., without being routed by a base station. In order to exchange sidelink communication, the sidelink devices may perform a discovery procedure. The discovery procedure may include monitoring for discovery signals from another sidelink device. The monitoring for discovery signals and/or sidelink reservation messages may consume power at a sidelink device. Aspects presented herein may help a UE to improve power efficiency while enabling the UE to discovery sidelink devices and monitor for sidelink communication. In some communication systems, a discovery channel may be a separate physical channel, where the transmission waveform/format may be different from data communication. If discovery messages are transmitted over a data channel, e.g., physical sidelink shared channel (PSSCH), a UE may decode and parse a message in order to determine the content of the message and to determine whether the message is a discovery message or a data message. A UE that is configured to receive a discovery message may monitor and decode a significant amount of communication to identify which messages are discovery messages.

Aspects presented herein may reduce decoding and power consumption at the UE through the use of a set of resources designated for discovery within a sidelink resource pool. As an example, a UE may use a sidelink resource pool having at least one set of resources for discovery and at least one set of resources for communication (e.g., data). The UE may use the different sets of resources for discovery and communication to skip monitoring communication in one or more sets of communication resources. The UE may receive discovery messages and data messages on a same channel, e.g., PSSCH, and may identify the different types of messages based on the resources of the sidelink resource pool in which a particular PSSCH is received.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. A UE 104 may include a sidelink discovery component 198 configured to exchange sidelink communication with other sidelink devices. In one aspect, the sidelink discovery component 198 may be configured to select a resource for a discovery message (e.g., such as an announcement message, a connection request, or a response to a connection request) from a sidelink resource pool that is partitioned into a first portion and a second portion. The sidelink discovery component 198 may be configured to transmit a discovery message to a second wireless device (e.g., other UE 104) using the resource selected from the first portion of the sidelink resource pool. The sidelink discovery component may be configured to monitor for a discovery response message from the second wireless device in the sidelink resource pool.

In another aspect, the sidelink discovery component 198 may be configured to monitor for a discovery message in a first portion of a sidelink resource pool, where the sidelink resource pool may be partitioned into the first portion and a second portion. The sidelink discovery component 198 may be configured to receive the discovery message in the first portion of the sidelink resource pool from a second wireless device. The sidelink discovery component may be configured to transmit a discovery response message or a connection establishment request message to the first wireless device in the sidelink resource pool.

The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2.

Figure 2:
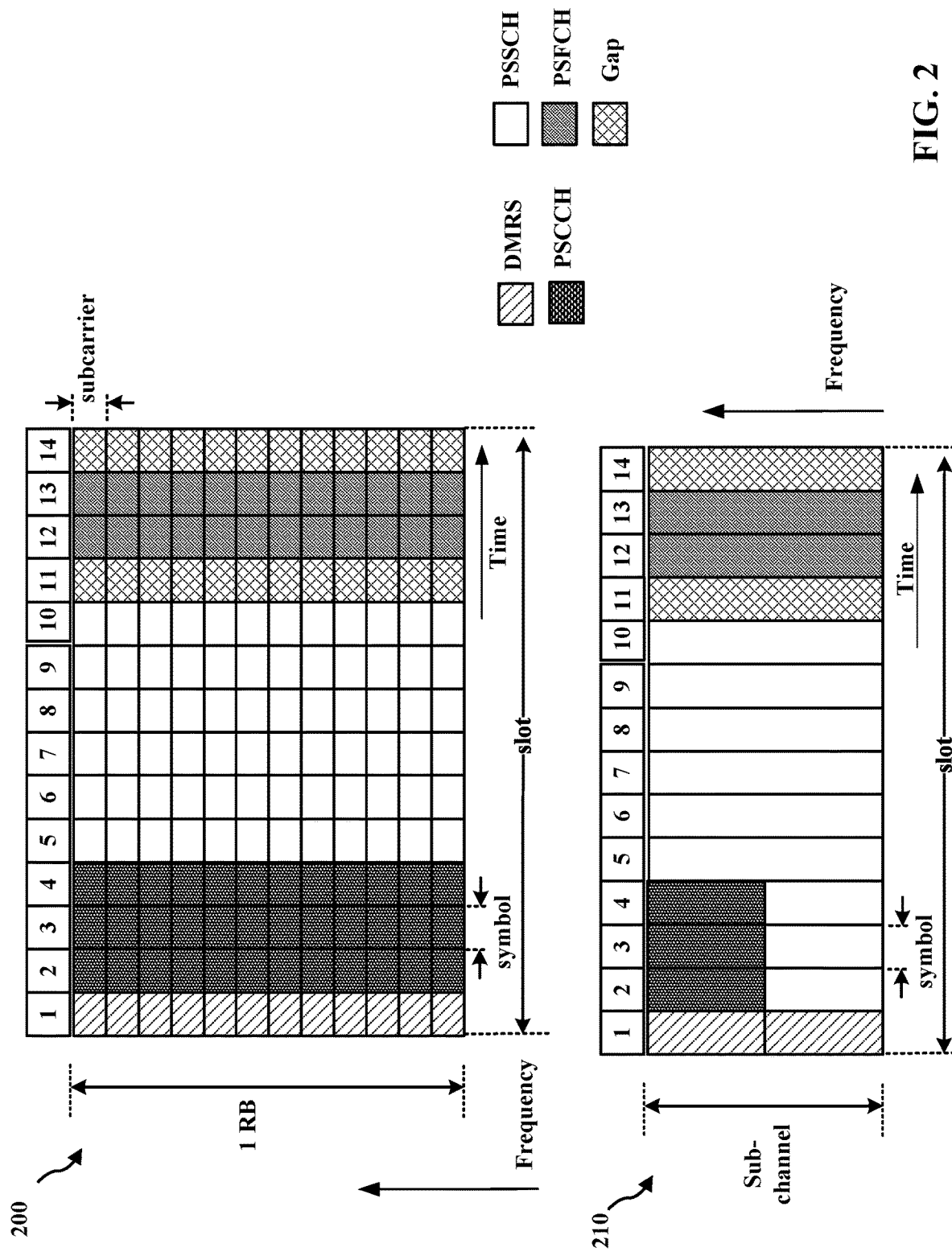
FIG. 2 illustrates example aspects of a sidelink slot structure.

Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
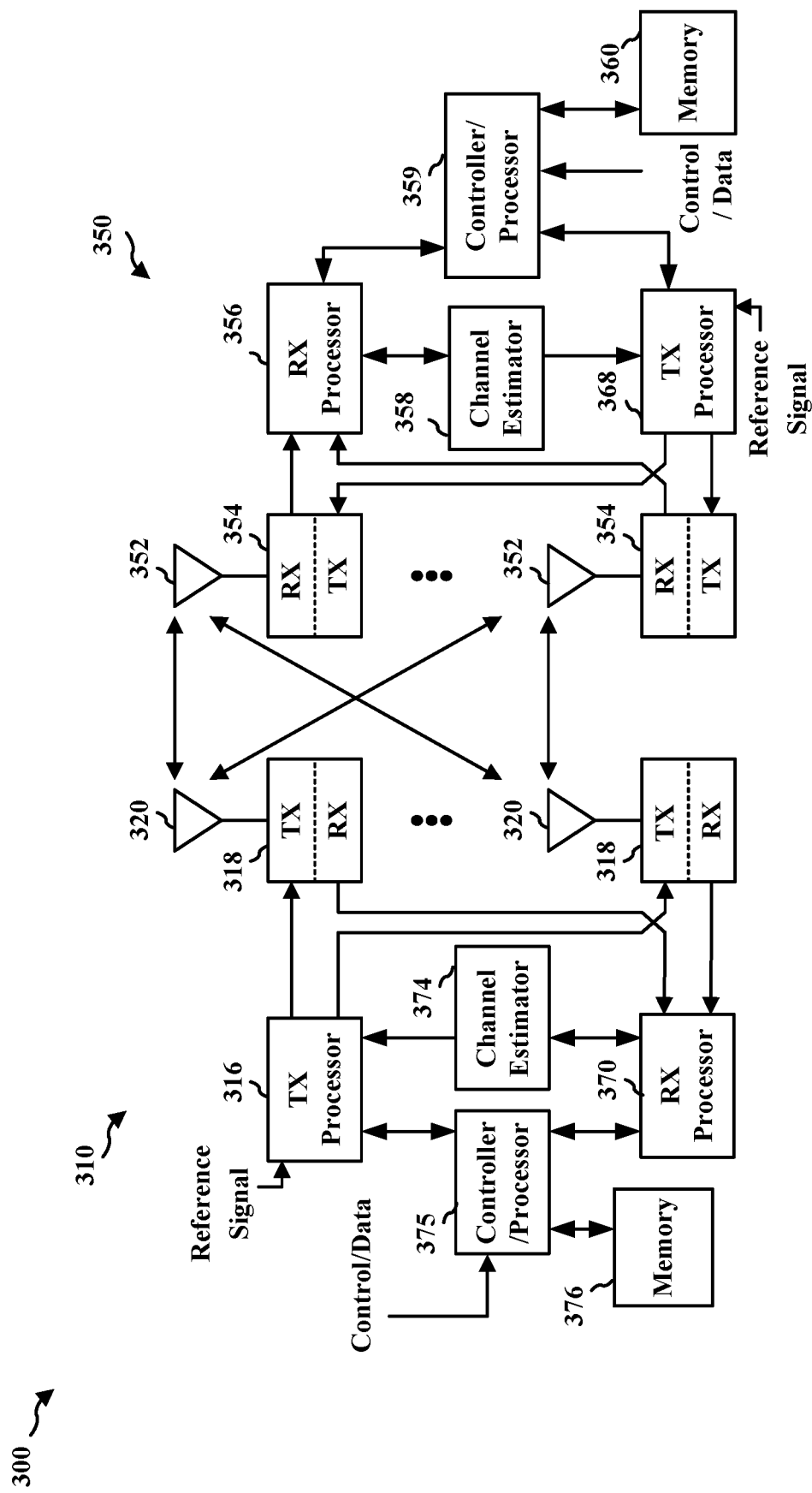
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 (TX). Each transmitter 318 (TX) may modulate an RF carrier with a respective spatial stream for transmission.

At the device 350, each receiver 354 (RX) receives a signal through its respective antenna 352. Each receiver 354 (RX) recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354 (TX). Each transmitter 354 (TX) may modulate an RF carrier with a respective spatial stream for transmission.

The transmission is processed at the device 310 in a manner similar to that described in connection with the receiver function at the device 350. Each receiver 318 (RX) receives a signal through its respective antenna 320. Each receiver 318 (RX) recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, the controller/processor 359, the TX processor 316, the RX processor 370, or the controller/processor 375 may be configured to perform aspects in connection with the sidelink discovery component 198 of FIG. 1. For example, the sidelink discovery component 198 may be configured to transmit discovery-related messages and/or monitor for discovery-related messages at specified resources pool(s) and/or time duration. The sidelink discovery component 198 may be configured to perform resource allocation for discovery-related messages.

Figure 4:
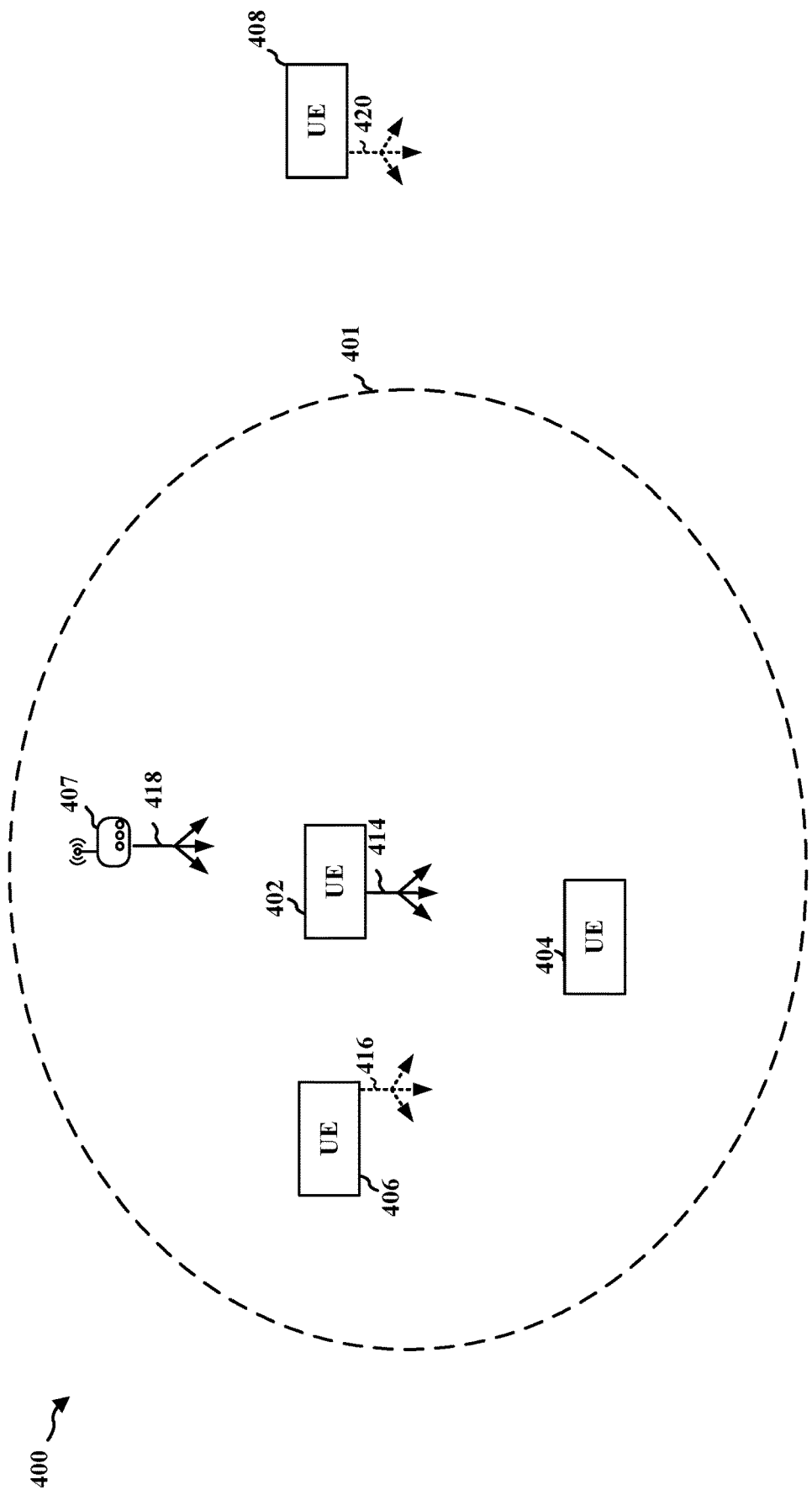
FIG. 4 illustrates an example sidelink communication system.

FIG. 4 illustrates an example 400 of wireless communication between devices based on sidelink communication. The communication may be based on a slot structure including aspects described in connection with FIG. 2. For example, transmitting UE 402 may transmit a transmission 414, e.g., including a control channel and/or a corresponding data channel, that may be received by receiving UEs 404, 406, 408. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 402, 404, 406, 408 may each be capable of operating as a transmitting device in addition to operating as a receiving device. Thus, UEs 406, 408 are illustrated as transmitting transmissions 416, 420. The transmissions 414, 416, 420 may be broadcast or multicast to nearby devices. For example, UE 414 may transmit communication that is to be received by other UEs within a range 401 of UE 414. Additionally, or alternatively, the RSU 407 may receive communication from and/or transmit communication 418 to UEs 402, 404, 406, 408.

Sidelink communication that is exchanged directly between devices may include discovery messages for sidelink UEs to find nearby UEs and/or may include sensing of resource reservations by other UEs in order to select resources for transmission. Sidelink communication may be based on different types or modes of resource allocation mechanisms. In a first resource allocation mode (which may be referred to herein as "Mode 1"), centralized resource allocation may be provided. For example, a base station 102 or 180 may determine resources for sidelink communication and may allocate resources to different UEs 104 to use for sidelink transmissions. In this first mode, a sidelink UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. These resource allocation mechanisms for sidelink may provide power savings, e.g., at a physical layer or a medium access control (MAC) layer. Power savings may be helpful in sidelink applications such as public safety applications, commercial applications, wearables, etc., which may include both periodic and aperiodic traffic.

Figure 5:
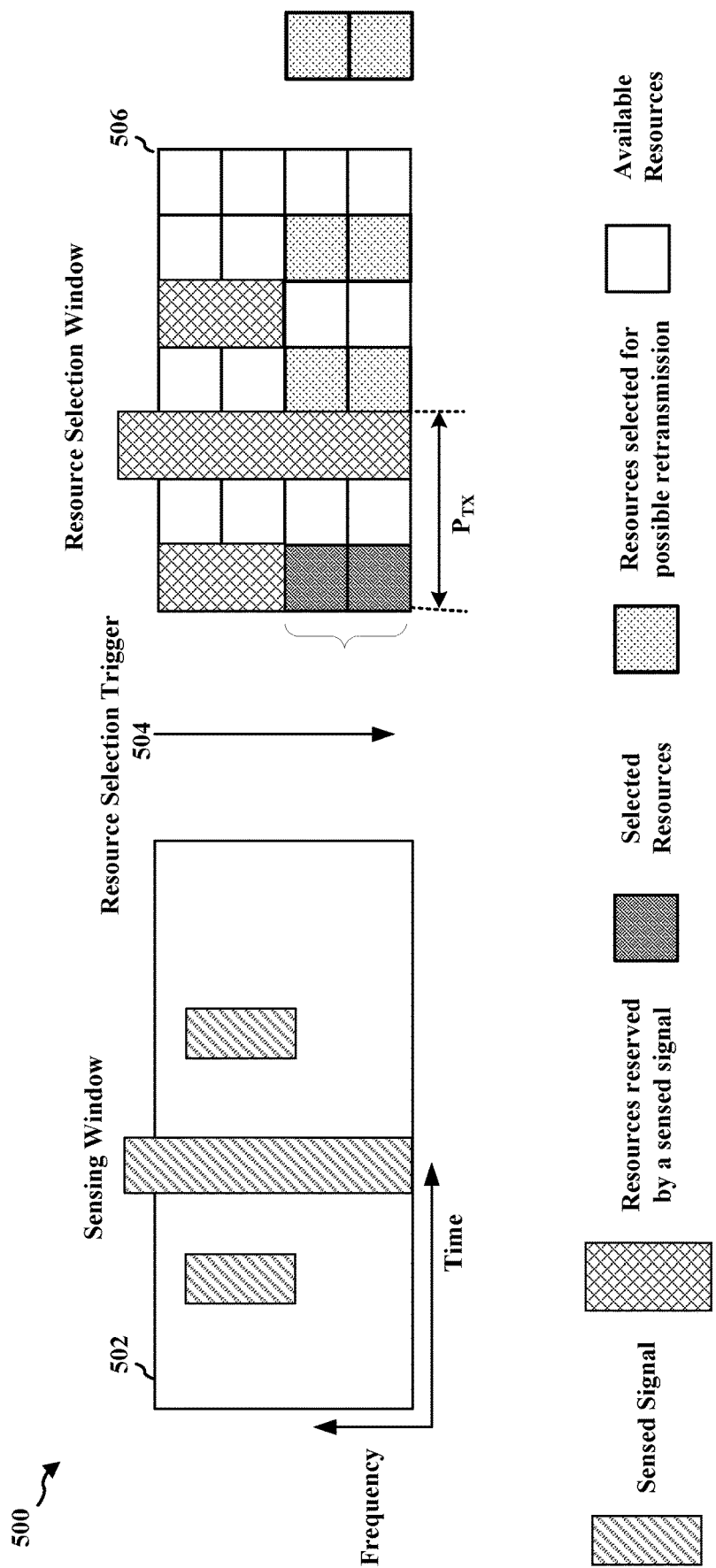
FIG. 5 illustrates an example of resource allocation based on sensing.

FIG. 5 illustrates an example of resource allocation based on sensing 500. The UE may perform sensing by monitoring for sidelink control information (SCI) indicating resources that the other UEs are using for transmitting sidelink transmissions. The SCI indicating resources may be described as reserving the sidelink resources. The indicated resources may be referred to as a sidelink reservation. The UE may monitor a set of frequency resources over a window of time, as shown at 502 in FIG. 5. The frequency range may be based on a set of resources for sidelink communication. The time and frequency resources for sidelink communication may be referred to as a resource pool. The UE may determine the available resources in the resource pool based on the remaining resources that are not reserved. For example, in Mode 2 resource allocation, a UE who is interested in transmitting a packet may perform the sensing (i.e., monitor the activity in a communication resource pool), and the UE may determine if a resource in a future slot is reserved by another UE in a past slot. The UE may use a resource if the resource is not reserved by another UE to transmit a packet of higher priority or if the resource is reserved by another UE but the RSRP of the signal transmitted by the other UE is below a threshold. In another example, the UE may reserve resources if a measurement for the corresponding SCI that is received in the sensing window meets a threshold, such as an RSRP threshold or other signal strength threshold. In other words, a resource pool may be the collection of time/frequency resources on which sidelink communication may occur. The resource pool may be pre-configured (i.e., preloaded) on a UE or configured by the base station.

After the occurrence of a resource selection trigger, at 504, the UE may select resources for transmission from the available resources in the resource pool. The resource selection may be triggered, by the UE having data for transmission, for example. FIG. 5 illustrates an example resource pool 506, and resources selected by the UE from the available resources that are not reserved by SCI received during the sensing window.

As discussed, sidelink devices may exchange direct sidelink communication with each other. To establish sidelink communication between sidelink devices (e.g., UEs), one sidelink device may attempt to discover another sidelink device via a discovery procedure at a higher layer (e.g., an application layer) of the protocol stack. The discovery mechanism may also be configured at a lower layer of the protocol stack. In one type of sidelink discovery model, as shown by a diagram 600A of FIG. 6A, to discover or determine the presence of another UE, a first UE 602 may broadcast/groupcast a discovery message. The discovery message may be an announcement message 606. The first UE 602 may broadcast the announcement message 606 indicating its presence as a sidelink device to other UEs (e.g., UE(s) 604) within a transmission range of the first UE 602. In response, the UE(s) 604 may transmit a connection request message 608 (which may also be referred to as a "connection establishment request message") to the first UE 602 if they are to establish a sidelink communication with the first UE 602. For example, referring back to FIG. 4, the UE 402 may broadcast an announcement message that may be received by the UEs 404 and 406, and other sidelink devices such as the RSU 407, within the transmission range 401 of the UE 402. A sidelink device such as the UE 404, that receives the announcement message may respond with a message (e.g., a connection request) to the first UE, e.g., UE 402. After discover each other, the UEs 402 and 404 may exchange sidelink communication. The first sidelink device or the first UE (e.g., the UE 402 or 602) transmitting the announcement message (e.g., announcement message 606) may be referred to as an announcing UE. The sidelink device(s) (e.g., UEs 404, 406, 604) transmitting the discovery response or monitoring for the announcement message may be referred to as the monitoring UE. The type of discovery involving a broadcast announcement and reply may be referred to as a first model of discovery, or "Model A" sidelink discovery.

In another type of sidelink discovery model, as shown by diagram 600B of FIG. 6B, a first UE 612 (e.g., UE 402) may broadcast a solicitation message 616 (which may also be referred to as a "discovery request message") to one or more UE(s) 614. The first UE 612 transmitting the solicitation message 616 may be referred to as a discoverer UE. In response, the UE(s) 614 receiving the solicitation message 616 may process the request and transmit a response message 618 to the first UE 612. The UE(s) 614 transmitting the response message 618 may be referred to as a discoveree UE. The type of discovery including a solicitation message or a discovery request message may be referred to as a second type of discovery or "Model B" sidelink discovery.

For sidelink devices to establish direct communications with each other based on the sidelink discovery models discussed in connection with FIGS. 6A and 6B, as broadcast/discovery messages (e.g., the announcement message 606, the solicitation message 616, etc.) may be communicated in a same sidelink resource pool as discovery response messages (e.g., the connection request message 608, the response message 618, etc.), a receiving sidelink device (e.g., the monitoring UE or the discoveree UE) or a transmitting sidelink device (e.g., the announcing UE or the discoverer UE) may be configured to monitor the sidelink resource pool continuously for discovery messages or for discovery response messages (collectively as "discovery-related messages"). The continuous monitoring of discovery-related messages may increase the power consumption at the receiving sidelink device and/or at the transmitting sidelink device, which may also reduce their performance.

There may be different designs for a discovery channel. In one example (e.g., for LTE D2D/V2X), a discovery channel may be defined as a separate physical channel, where the transmission waveform/format may be different from data communication. In another example (e.g., for NR D2D/V2X), all discovery messages may be transmitted over data channel. Thus, if discovery messages are transmitted in a common resource pool with other data communications, the receiving UE may not be able to determine whether such communication is for data or for discovery, prior to decoding the messages and parse the content of the messages. As such, if a UE is configured to receive a discovery message, the UE may have to monitor and decode all communications happening in a resource pool.

Aspects presented herein may improve the resource allocation of sidelink communications. Aspects presented herein may reduce power consumption at a receiving sidelink device and/or at a transmitting sidelink device when the sidelink devices are performing sidelink discovery procedures. In one aspect of the present disclosure, a discovery resource pool (e.g., a resource pool for transmitting discover messages) may be separately configured from a communication resource pool (e.g., a resource pool used for transmitting communications or data) for sidelink devices (e.g., receiving sidelink devices and/or transmitting sidelink devices), such that sidelink devices may skip monitoring for certain communication pool if the communication pool does not have any communication (e.g., discovery) messages for the sidelink devices or if the communication pool or a portion of the communication pool is not expected to carry any discovery-related messages. This may enable power saving for the sidelink devices as the sidelink devices may skip or avoid monitoring the resource pool continuously for discovery-related messages.

Figure 7:
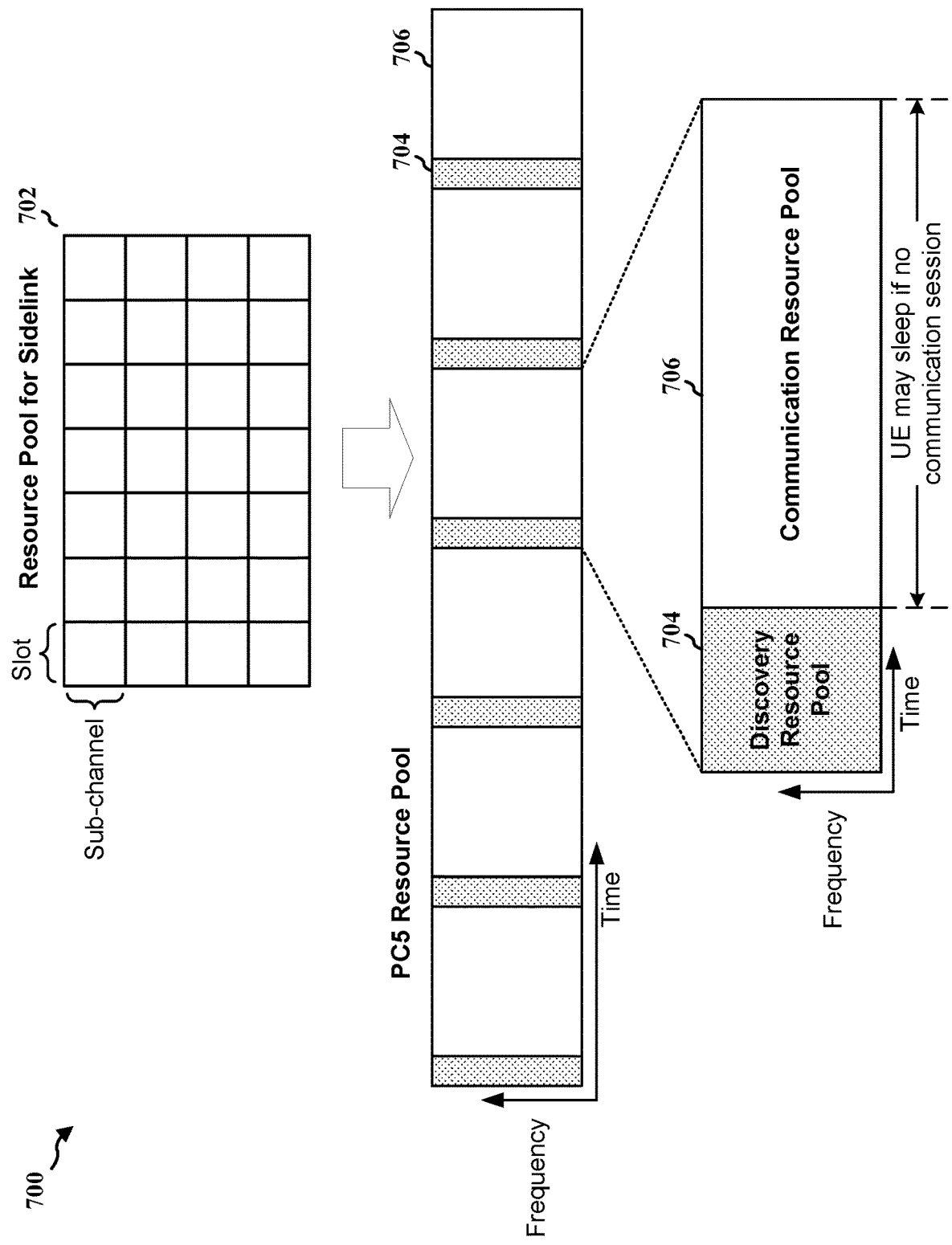
FIG. 7 is a diagram illustrating an example of partitioning a sidelink resource pool.

FIG. 7 is a diagram 700 illustrating an example of partitioning a sidelink resource pool 702 into one or more discovery resource pools 704 and one or more communication resource pools 706 in accordance with various aspects of the present disclosure, where each discovery resource pool 704 may correspond to a communication resource pools 706. A transmitting UE (e.g., the UE 402, 602, 612) may transmit/broadcast discovery messages (e.g., the announcement message 606, the solicitation message 616, etc.) in the discovery resource pool 704, and a receiving UE (e.g., the UE 404, 406, 604, 614) may monitor for discovery messages in the discovery resource pool 704. This may enable the receiving UE to skip monitoring for discovery messages in the communication resource pool 706 to reduce power consumption. For example, a UE that does not have any connection with other UE(s) over the sidelink may transmit or look for broadcasted discovery messages in the discovery resource pool 704 and may exclude the monitoring for the communication resource pools 706 (e.g., the UE may enter into an idle or a sleep mode during the communication resource pools 706). This may also improve the efficiency for UEs to establish sidelink communication with each other.

As shown by FIGS. 6A and 6B, during a sidelink discovery procedure, some messages from a UE (e.g., 602, 612) may be broadcast/groupcast messages (e.g., announcement message 606, solicitation message 616, etc.) and some messages from a UE (e.g., 604, 614) may be unicast messages (e.g., the connection request message 608, the response message 618, etc.). In another aspect of the present disclosure, further improvement in resource allocation and power saving may be achieved by partitioning a discovery resource pool into one or more parts, where there may be a part for transmitting broadcast/groupcast messages and a different part for transmitting (or monitoring) unicast messages. This may further narrow the time and/or resource in which a UE monitors for or transmits discovery-related messages.

Figure 8:
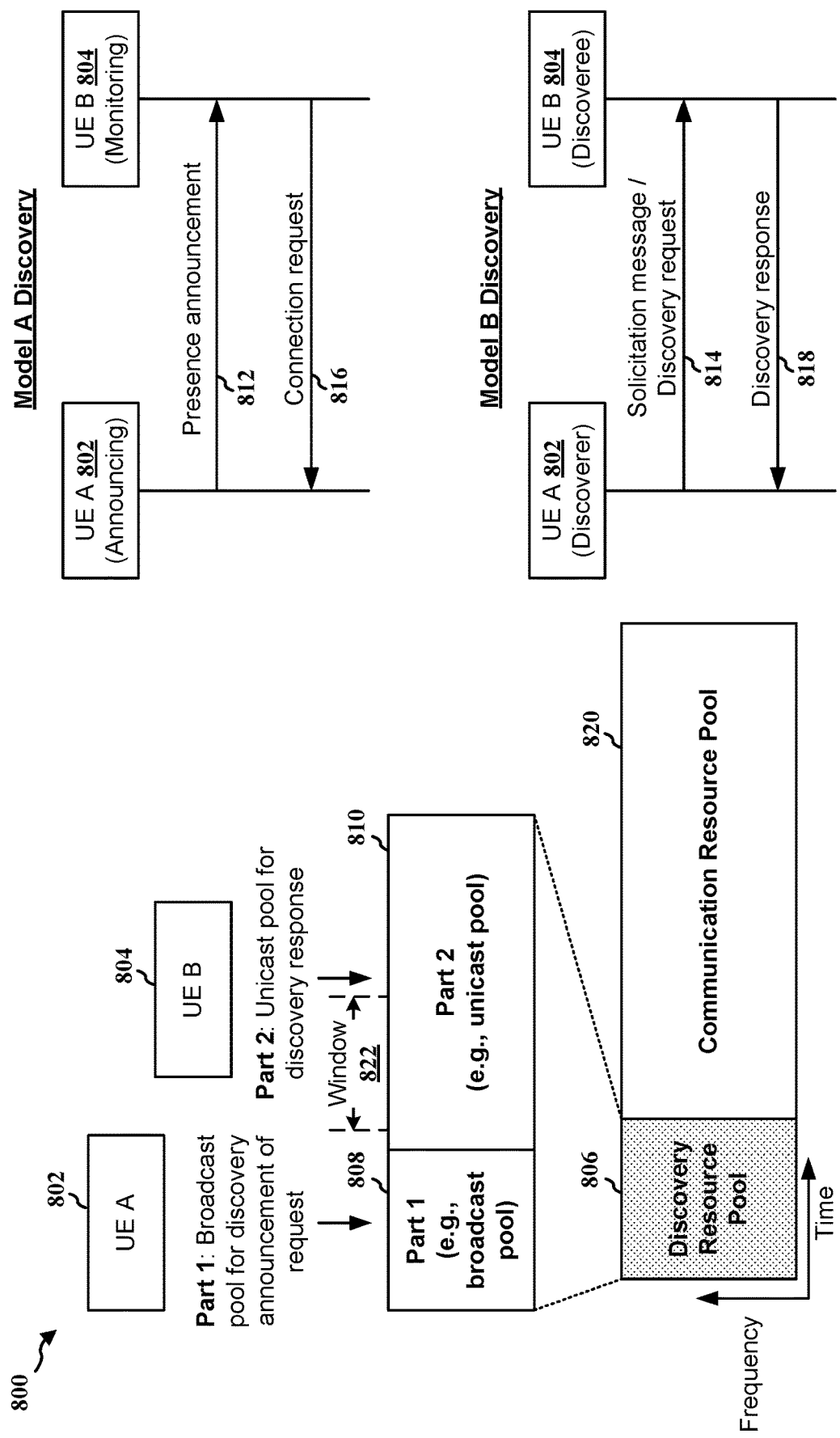
FIG. 8 is a diagram illustrating an example of partitioning a discovery resource pool.

FIG. 8 is a diagram 800 illustrating an example of partitioning a discovery resource pool into multiple parts in accordance with various aspects of the present disclosure. For example, as shown by diagram 800, a discovery resource pool 806 (e.g., the discovery resource pool 704) may be partitioned into a first part (e.g., part 1) and a second part (e.g., part 2). The first part may be referred to as a broadcast pool 808 and the second part may be referred to as a unicast pool 810. A UE 802 (e.g., UE 402, 602, 612) may use the broadcast pool 808 to transmit broadcast/groupcast messages, such as the presence announcement message 812 in Model A sidelink discovery or the solicitation/discovery request messages 814 in Model B sidelink discovery, to other UEs (e.g., UEs 604, 614). Thus, for other UEs such as a UE 804 to detect discovery-related broadcast/groupcast messages, they may scan/monitor the broadcast pool 808. After a UE receives/detects the discovery related broadcast/groupcast messages in the broadcast pool 808, the UE may respond to the broadcast/groupcast messages using the unicast pool 810. For example, after the UE 804 receives the presence announcement message 812 or the solicitation message 814 broadcasted/groupcasted by the UE 802, the UE 804 may transmit a connection request message 816 (e.g., for Model A sidelink discovery) or a discovery response message 818 (e.g., for Model B sidelink discovery) to the UE 802 using the unicast pool 810. Thus, the UE that initiates the discovery may monitor the unicast pool (e.g., part 2 of the discovery resource pool 806) for discovery responses. For example, after the UE 802 broadcasted/groupcasted the presence announcement message 812 or the solicitation message 814, the UE 802 may monitor for connection request messages (e.g., 816) and/or discovery response messages (e.g., 818) from other UEs such as the UE 804 in the unicast pool 810 (e.g., without monitoring the unicast pool 810 and/or the communication resource pool 820 for discovery-related broadcast/groupcast messages). In addition, the UE 802 may determine not to monitor the communication resource pool 820 if the UE 802 doesn't have a connection with other UEs. When a UE (e.g., 804) is not monitoring for discovery related broadcast/groupcast messages (e.g., 812, 814), such as when the UE is outside of the broadcast pool 808, the UE may enter into or remain in an idle mode or a sleep mode to reduce power consumption. There may be one or more parameters that are configured separately for the broadcast pool 808 and the unicast pool 810, such as parameters for power control and/or HARQ feedbacks, etc.

In another aspect of the present disclosure, as the duration for a discovery pool (e.g., 704, 806) may be short, a UE may transmit discovery related broadcast/groupcast messages in the discovery pool and monitor for response to the broadcast/groupcast messages in a communication resource pool. For example, as shown by diagram 900 of FIG. 9, a UE 902 (e.g., UE 402, 602, 612) may transmit broadcast/groupcast messages, such as the presence announcement message 912 in Model A sidelink discovery or the solicitation/discovery request messages 914 in Model B sidelink discovery to other UEs (e.g., UEs 604, 614) using the discovery resource pool 906 (e.g., the discovery resource pool 704). Thus, for other UEs such as a UE 904 to detect discovery related broadcast/groupcast messages, they may scan/monitor the discovery resource pool 906. After a UE receives/detects the discovery related broadcast/groupcast messages in the discovery resource pool 906, the UE may respond to the broadcast/groupcast messages using the communication resource pool 908. For example, after the UE 904 receives the presence announcement message 912 or the solicitation message 914 broadcasted/groupcasted by the UE 902, the UE 904 may transmit a connection request message 916 (e.g., for Model A sidelink discovery) or a discovery response message 918 (e.g., for Model B sidelink discovery) to the UE 902 using the communication resource pool 908. Thus, the UE that initiates the discovery may monitor the communication resource pool 908 for discovery responses. For example, after the UE 902 broadcasted/groupcasted the presence announcement message 912 or the solicitation message 914, the UE 902 may monitor for connection request messages (e.g., 916) and/or discovery response messages (e.g., 918) from other UEs such as the UE 904 in the communication resource pool 908.

In addition, a network may configure multiple communication resource pools for a sidelink bandwidth part (BWP) and/or a sidelink carrier, where a sidelink device such as a UE may select one or more communication resource pools for communication depending on its mobility state. Thus, a UE (e.g., the UE 802, 902) transmitting broadcast messages (e.g., the presence announcement message or the solicitation/discovery request message) may include information about the one or more communication resource pools in which the transmitting UE may monitor for discovery response (e.g., the connection request message or the discovery response message) in the broadcast messages. In response, a UE (e.g., 804, 904) responding to the broadcast messages may transmit the discovery response to the transmitting UE based on or using the one or more communication resource pools.

In one example, to enhance the efficiency of the discovery messages monitoring or to reduce the time a UE monitors for discovery response messages (e.g., 916, 918), a UE transmitting the broadcast/groupcast message may define a time window in which the UE monitors for the discovery responses. For example, the UE 902 may indicate to other UEs (e.g., the UE 904) through the broadcast/group message (e.g., 912, 914) or in a separate message a time window 910 in which the UE 902 monitors for discovery response messages (e.g., 916, 918). Thus, after a UE (e.g., 904) receives/detects the discovery related broadcast/groupcast messages in the discovery resource pool 906, the UE may respond to the broadcast/groupcast messages within the time window 910 of the communication resource pool 908. For example, after the UE 904 receives the presence announcement message 912 or the solicitation message 914 broadcasted/groupcasted by the UE 902, the UE 904 may transmit a connection request message 916 (e.g., for Model A sidelink discovery) or a discovery response message 918 (e.g., for Model B sidelink discovery) to the UE 902 within the time window 910 of the communication resource pool 908. Thus, the UE that initiates the discovery may monitor the time window 910 within the communication resource pool 908 for discovery responses, and may skip monitoring for discovery responses or enter into a sleep/idle mode outside of the time window 910. For example, after the UE 902 broadcasted/groupcasted the presence announcement message 912 or the solicitation message 914, the UE 902 may monitor for connection request messages (e.g., 916) or discovery response messages (e.g., 918) from other UEs (e.g., the UE 904) within the time window 910 of the communication resource pool 908. This may reduce the time in which the UE 902 monitors for discovery response messages, which may enable additional power saving for the UE 902 as the UE 902 may enter into a sleep/idle mode when it is outside of the time window 910.

Similarly, referring back to FIG. 8, if the connection request message 816 or the discovery response message 818 is to be received in the unicast pool 810 of the discovery resource pool 806 as described in connection with FIG. 8, the UE 802 may indicate to other UEs (e.g., the UE 804) through the broadcast/group message (e.g., the broadcast/group message 812, 814) or in a separate message a time window 822 in which the UE 802 monitors for discovery response messages. After a UE receives/detects the discovery-related broadcast/groupcast messages in the broadcast pool 808, the UE may respond to the broadcast/groupcast messages within the time window 822 of the unicast pool 810. Thus, the transmitting UE may skip monitoring for discovery response messages when it is outside the time window 822.

Figure 9:
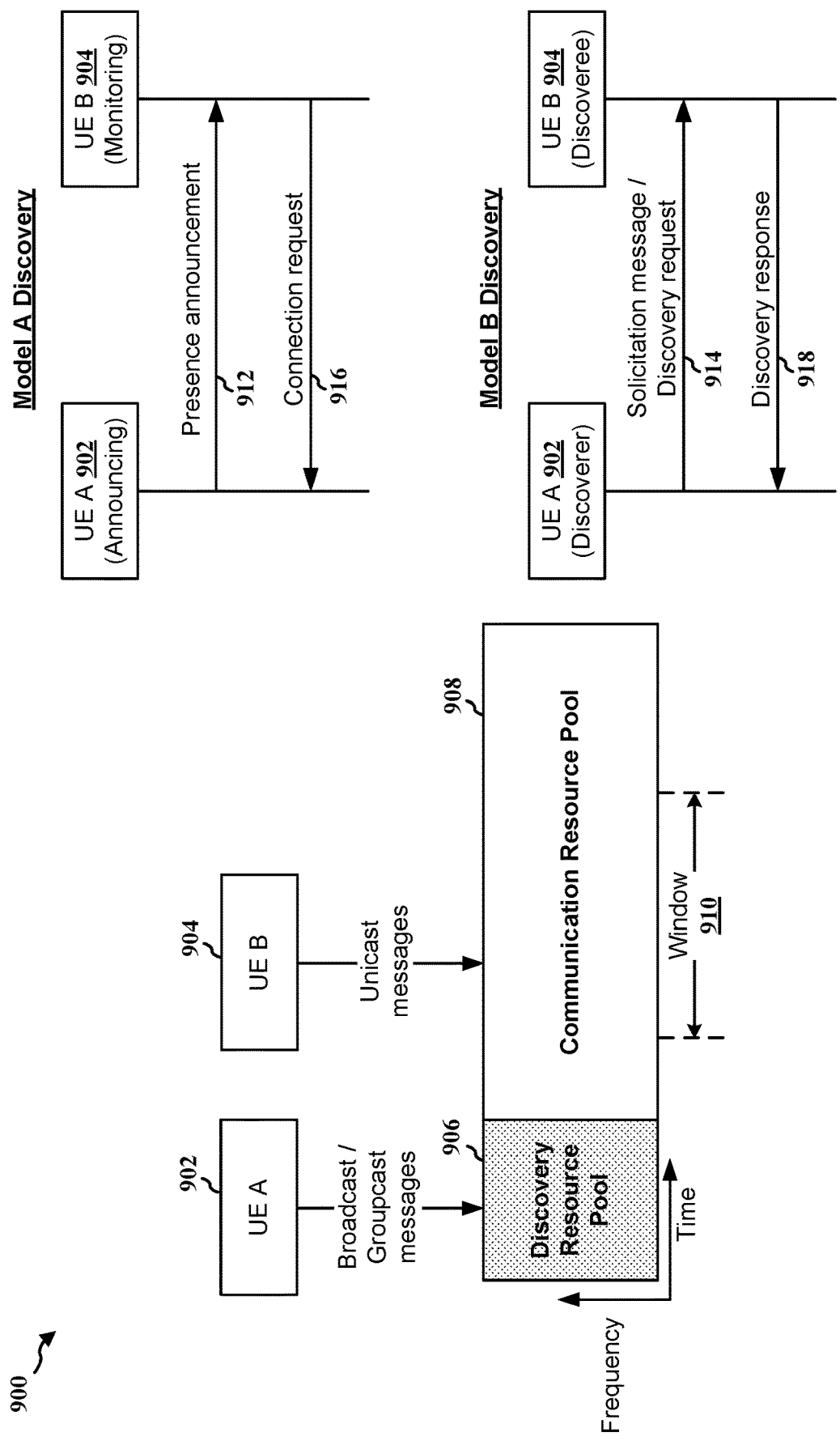
FIG. 9 is a diagram illustrating an example of sidelink discovery.

In another example, the time window aspects described in connection with FIGS. 8 and 9 (e.g., the time window 822, 910) may also apply to a sidelink resource pool that is not partitioned into multiple parts (e.g., into a discovery resource pool and a communication resources pool). For example, a transmitting UE (e.g., the UE 402, 602, 612) may transmit a discovery related broadcast message (e.g., the announcement message 606 or solicitation message 616) in a sidelink resource pool that indicates a time window in which the transmitting UE monitors for discovery response messages (e.g., 608, 618) to the broadcast message within the sidelink resource pool. In response, a receiving UE (e.g., the UE 404, 406, 604, 614) may transmit the response messages within the time window defined. Thus, the transmitting UE may skip monitoring for discovery response messages when it is outside the time window.

Figure 10:
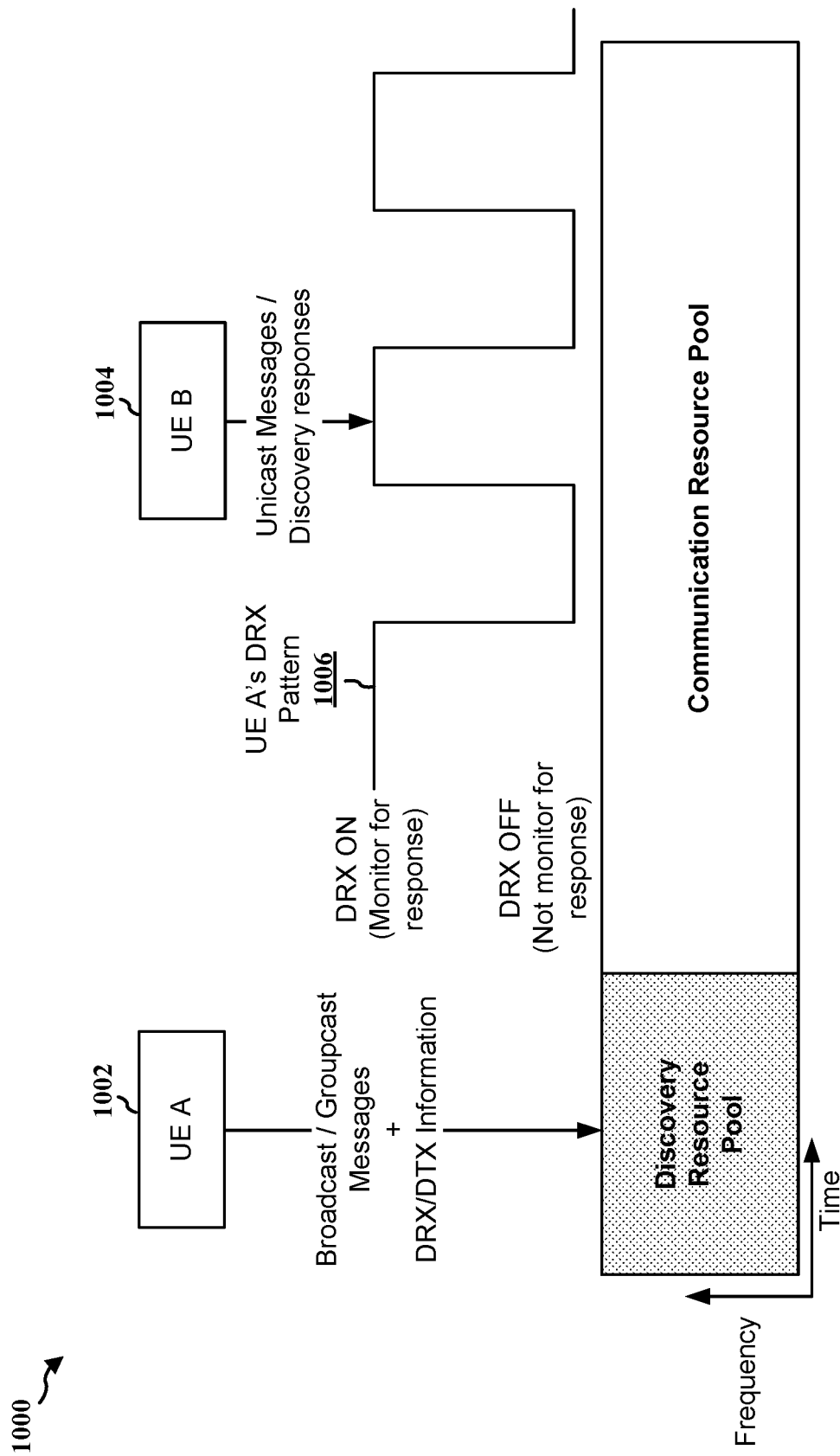
FIG. 10 is a diagram illustrating an example of sidelink discovery.

In another example, a UE transmitting the broadcast/groupcast message may indicate its discontinuous reception (DRX) or discontinuous transmission (DTX) information to the other UE, such that other UEs may respond to the broadcast/groupcast message based at least in part on the transmitting UE's DRX/DTX pattern, e.g., during the transmitting UE's DRX active duration or the UE's DTX active duration. A UE may reduce power consumption through DRX in which the UE monitors for communication or transmits communication during a DRX ON duration and does not monitor for communication or transmit communication during a DRX OFF duration. The DRX OFF duration may correspond to a time during which the UE operates in a lower power mode, a sleep mode, etc. By having periods during which the UE does not monitor for or transmit communication, the UE may save power or extend battery life for the UE. For example, as shown by diagram 1000 of FIG. 10, a first UE 1002 may provide information about the DRX pattern 1006 in a broadcast announcement message and/or in a reply to a sidelink discovery message. Then, the first UE 1002 may monitor for sidelink communication (e.g., discovery responses) based on the DRX pattern 1006 (e.g., during the DRX ON duration). When a second UE 1004 receives the broadcast announcement message, the second UE 1004 may transmit communication (e.g., discovery responses) to the first UE 1002 based on the first UE's DRX pattern 1006, such as when the first UE 1002 is on the DRX ON duration.

Figure 11:
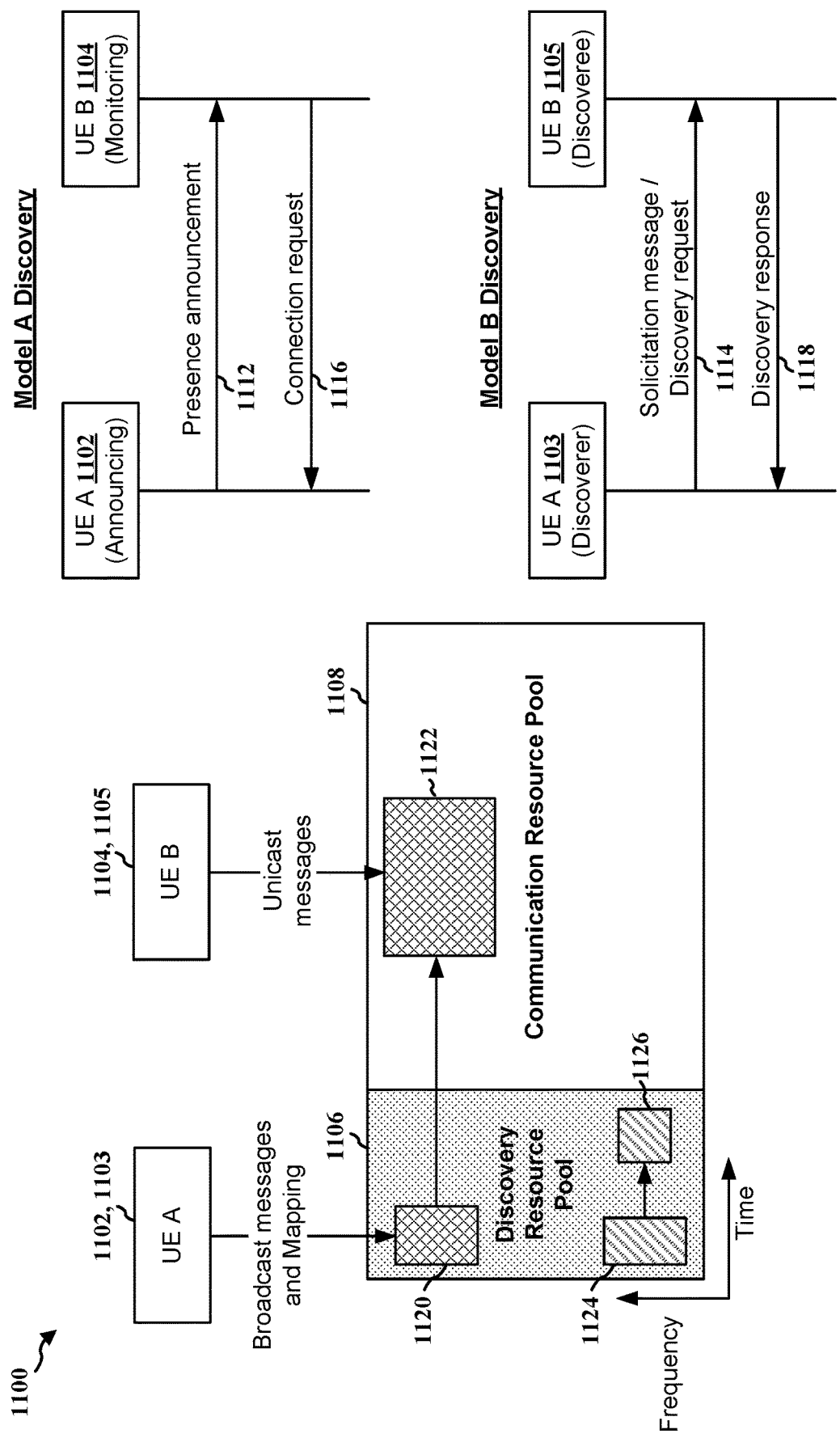
FIG. 11 is a diagram illustrating an example of sidelink discovery and resource allocation.

In another aspect of the present disclosure, a UE responding to the broadcast/groupcast message may determine resources for transmitting response message based at least in part on a resource mapping. FIG. 11 is a diagram 1100 illustrating an example of the resource mapping in accordance with various aspects of the present disclosure. As shown by the diagram 1100, for Model A sidelink discovery, a UE 1102 may broadcast the presence announcement message 1112 periodically, where the resource allocation for transmitting the presence announcement message 1112 may be performed via sensing and periodic resource reservation (e.g., within the discovery resource pool 1106), such as described in connection with FIG. 5. However, for a UE 1104 that is responding to the presence announcement message 1112, the resource in which the UE 1104 uses for transmitting the connection request message 1116 may be less predictable or random as the UE 1104 may not have reserved a resource for sending the connection request message 1116. Thus, the UE 1104 may select a random resource for transmitting the connection request message 1116. The random resource selected by the UE 1104 may collide with other UEs' transmission resulting in a resource collision, which may lower the transmission reliability of the UE 1104. Similarly, for Model B sidelink discovery, a UE 1103 may broadcast the discovery request message 1114 periodically. However, for a UE 1105 that is responding to the discovery request message 1114, the resource in which the UE 1105 uses for transmitting a discovery response message 1118 may be less predictable or random as the UE 1105 may not have reserved a resource for sending the discovery response message 1118 in advance. Thus, the UE 1105 may select a random resource for transmitting discovery response message 1118, which may result in resource collision and may lower the transmission reliability of the UE 1105.

In one example, to enhance the reliability of transmissions between a UE transmitting the broadcast messages (e.g., 1112, 1114) and a UE responding to the broadcast message, a mapping between resource(s) for the broadcast messages and resource(s) for discovery responses may be defined for the UEs or by the UE transmitting the broadcast messages. For example, referring back to FIG. 11, when the UE 1102, 1103 reserves a resource 1120 or 1124 in the discovery resource pool 1106 for transmitting the broadcast messages (e.g., 1112, 1114), a mapping may be used to determine a corresponding resource 1122 or 1126 for the UE 1104 to transmit the connection request message 1116 or for the UE 1105 to transmit the discovery response message 1118. The mapping may also determine the reserved resource 1120 or 1124 in which the UE 1102, 1103 may use for transmitting the broadcast messages. For example, the UE 1102, 1103 may determine the reserved resource 1120 or 1124 based at least in part on a PSCCH or a PSSCH that the UE uses for transmitting the broadcast message. In another example, for Model A sidelink discovery, if the connection request message 1116 is to be received in the communication resource pool 1108 as described in connection with FIG. 9, the UE 1104 who is establishing a connection with the UE 1102 may determine the resource 1122 for sending the connection request message 1116 based at least in part on the resource 1120 in which it received the PSCCH or the PSSCH carrying the announcement message 1112 and the mapping. In another example, for Model B sidelink discovery, if the discovery response message 1118 is to be received in the discovery resource pool 1106 as described in connection with FIG. 8, the UE 1105 who is configured to transmit discovery response message 1118 to the UE 1103 may send the discovery response message 1118 using the resource 1126 that is derived based at least in part on the PSCCH or the PSSCH carrying the discovery request message 1114 and the mapping. The corresponding resource 1122 or 1126 may include single resource or multiple resources. If the corresponding resource 1122 or 1126 includes multiple resources, the responding UE (e.g., the UE 1104, 1105) may select one of the multiple resources for transmitting the response message (e.g., the connection request message 1116 or the discovery response message 1118). For example, if a portion of the multiple resources overlaps with one or more resources reserved/used by another UE or another discovery message, the responding UE may transmit the response message to the corresponding broadcasting UE (e.g., the UE 1102, 1103) using resources that are not overlapped.

In other words, a first UE (e.g., the UE 1102, 1103) transmitting the broadcast message (e.g., the discovery message, 1112, 1114) and/or a second UE (e.g., the UE 1104, 1105) receiving/monitoring the broadcast message may determine a set of resources to communicate the discovery response messages (e.g., the response messages 1116, 1118) based on one or more parameters associated with the resources in which the broadcast message is transmitted from the first UE and a mapping function. For example, the physical layer parameter of the resources for the broadcast message from the first UE may include at least one of the followings: the sub-channel, the resource block (RB), slot index of PSSCH or PSCCH, an ID associated with the first UE (e.g., a source ID indicated in the discovery/broadcast message from the first UE) and/or a zone ID associated with the first UE, etc.

In another aspect of the present disclosure, a first UE transmitting the broadcast/groupcast message may provide resource allocation for a second UE that is responding to the broadcast/groupcast message (e.g., connection establishment request message, discovery request message, etc.) based on an inter-UE coordination. FIG. 12 is a diagram 1200 illustrating an example of resource allocation for discovery via inter-UE coordination in accordance with various aspects of the present disclosure. As shown by the diagram 1200, for Model A sidelink discovery, a first UE 1202 may broadcast a presence announcement message 1212 periodically, where the resource (e.g., 1220 or 1224) for transmitting the presence announcement message 1212 may be performed via sensing 1211 and periodic resource reservation (e.g., within the discovery pool 1206) by the first UE 1202, such as described in connection with FIG. 5. During the sensing 1211 and the periodic resource reservation, the first UE 1202 may also determine a resource or a set of resources 1222 or 1226 (e.g., slots within the communication resource pool 1208 or the discovery resource pool 1206 or a non-partitioned sidelink resource pool depending on the configuration) for a second UE 1204 to send a connection request message 1216. The first UE 1202 may indicate the resource or the set of resources 1222 or 1226 to the second UE 1204 in the presence announcement message 1212. After the UE 1204 receives the presence announcement message 1212 that includes the resource or the set of resources 1222 or 1226, as shown at 1215, the UE 1204 may select a resource from the resource or the set of resources 1222 or 1226 for transmitting the connection request message 1216. In other words, the UE 1204 may select (e.g., randomly) a resource from the resources/slots suggested by the first UE 1202 without performing a sensing. The randomization on resource selection may avoid resource collisions between multiple monitoring UEs (e.g., UE 604, 1204). In addition, the UE 1204 may pick a random orthogonal cover code (OCC) for PSSCH DMRS, which may allow multiple monitoring UEs to use the same resource for transmission (e.g., for connection establishment request message).

Similarly, for Model B sidelink discovery, a first UE 1203 may broadcast a solicitation message 1214 periodically, where the resource (e.g., 1220 or 1224) for transmitting the solicitation message 1214 may be performed via sensing 1213 and periodic resource reservation (e.g., within the discovery resource pool 1206) by the first UE 1203, such as described in connection with FIG. 5. During the sensing 1213 and the periodic resource reservation, the first UE 1203 may also determine a resource or a set of resources 1222 or 1226 (e.g., slots within the communication resource pool 1208 or the discovery resource pool 1206 or a non-partitioned sidelink resource pool depending on the configuration) for a second UE 1205 to send a discovery response message 1218. The first UE 1203 may indicate the resource or the set of resources 1222 or 1226 to the second UE 1205 in the solicitation message 1214. After the UE 1205 receives the solicitation message 1214 that includes the resource or the set of resources 1222 or 1226, as shown at 1217, the UE 1205 may select a resource from the resource or the set of resources 1222 or 1226 for transmitting the discovery response message 1218. As such, the UE 1205 may select (e.g., randomly) a resource from the resources/slots suggested by the first UE 1203 without performing a sensing. The randomization on resource selection may avoid resource collisions between multiple discoveree UEs (e.g., UE 614, 1205). In addition, the UE 1205 may pick a random orthogonal cover code (OCC) for PSSCH DMRS, which may allow multiple discoveree UEs to use the same resource for transmission (e.g., for transmitting discovery response message).

When two or more announcing or discoverer UEs (e.g., the first UE 1202 or 1203 and a third UE) transmit broadcast messages (e.g., the presence announcement message 1212 or the solicitation message 1214) with a corresponding selected resources, some of the resources may overlap with each other. In one example, a monitoring or discoveree UE (e.g., the second UE 1204 or 1205) may choose a resource which is only selected by one of the announcing or discoverer UEs and communicate with this UE accordingly. In other words, the monitoring or discoveree UE may select the non-overlapping resources for transmitting the connection request message 1216 or the discovery response message 1218 to the first UE 1202 or 1203 or the third UE. For example, the second UE 1204 may receive a presence announcement message 1212 from the first UE 1202 which indicate that resources A, B and C may be used by the second UE 1204 for transmitting the connection request message 1216 to the first UE 1202. The second UE 1204 may also receive another presence announcement message from a third UE which indicate that resources B, C and D may be used by the second UE 1204 for transmitting a connection request message to the third UE. Thus, the second UE 1204 may use the resource A which does not overlap with resources indicated by the third UE (e.g., resources B, C, D) for transmitting the connection request message 1216 to the first UE 1202, and the second UE 1204 may use the resource D which does not overlap with resources indicated by the first UE 1202 (e.g., resources A, B, C) for transmitting the connection request to the third UE. This mechanism may be used for UEs with different capabilities. For example, the first UE 1202 may be a more capable UE (e.g., a phone), whereas the second UE 1204 may be a less capable UE (e.g., wearables).

Figure 13:
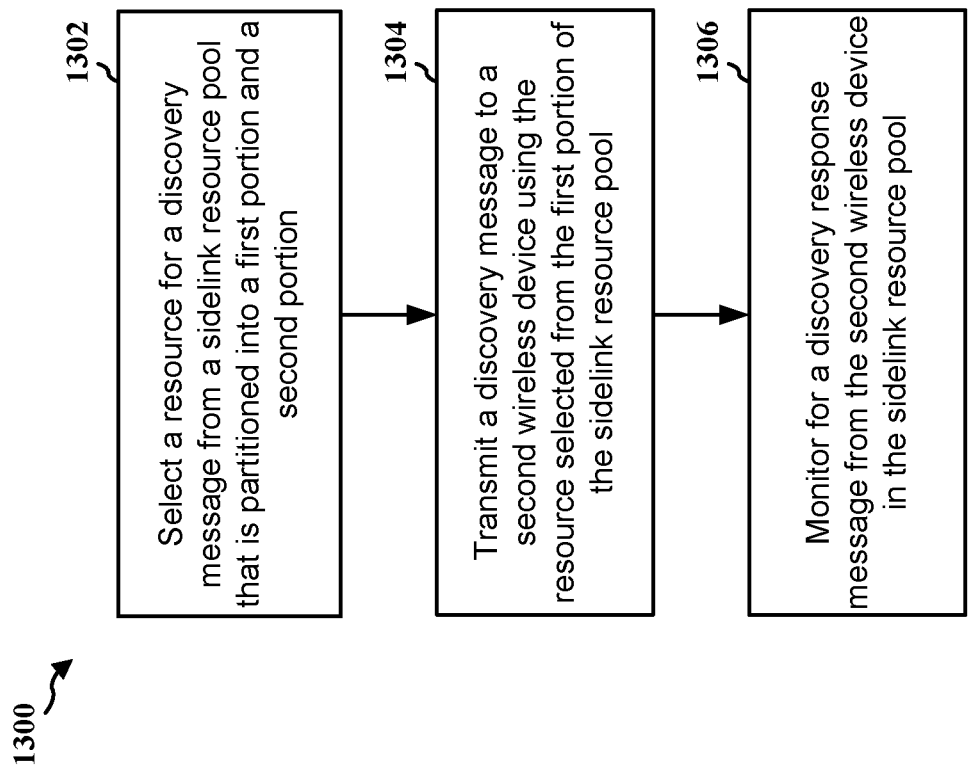
FIG. 13 is a flowchart of a method of wireless communication.

FIG. 13 is a flowchart 1300 of a method of wireless communication. The method may be performed by a first wireless device communicating based on sidelink (e.g., the UE 104, 402, 404, 406, 602, 612, 802, 902, 1002, 1102, 1103, 1202, 1203; the device 310 or 350, the RSU 407; the apparatus 1402). Optional aspects are illustrated with a dashed line. The method may enable the first wireless device to select a resource for broadcasting discovery-related messages and/or to select one or more resources or time duration for a second wireless device to transmit responses for the broadcasted discovery-related messages.

At 1302, the first wireless device may select a resource for a discovery message from a sidelink resource pool that is partitioned into a first portion and a second portion, such as described in connection with FIGS. 7 to 12. For example, the UE 802 or 902 may select a resource from a discovery resource pool 806/906 for broadcasting presence announcement message 812/912 or solicitation message 814/914, where the discovery resource pool 806/906 is separated from the communication resource pool 820/908. The selection of the resource may be performed by, e.g., the resource selection component 1440 of the apparatus 1402 in FIG. 14.

In one example, the first portion of the resource pool may be a discovery resource pool and the second portion of the resource pool may be a communication resource pool. In addition, the discovery message may be a discovery announcement message or a discovery solicitation message. One or more parameters configured for the first portion of the resource pool may be different from the second portion of the resource pool. For example, the one or more parameters may include at least one of parameters for a power control or a HARQ feedback. In another example, the discovery message may indicate a time window in which the first wireless device monitors for the discovery response message from the second wireless device.

At 1304, the first wireless device may transmit a discovery message to a second wireless device using the resource selected from the first portion of the sidelink resource pool, such as described in connection with FIGS. 7 to 12. For example, the UE 802 or 902 may broadcast/groupcast presence announcement message 812/912 or solicitation message 814/914 using the resource selected from the discovery resource pool 806/906. The first wireless device may transmit the discovery message periodically. The transmission of the discovery message may be performed by, e.g., the discovery message process component 1442 and/or the transmission component 1434 of the apparatus 1402 in FIG. 14.

At 1306, the first wireless device may monitor for a discovery response message from the second wireless device in the sidelink resource pool, such as described in connection with FIGS. 7 to 12. For example, the UE 802 may monitor for a discovery response message (e.g., connection request message 816, discovery response message 818) in a unicast pool 810 which is part of the sidelink resource pool; the UE 902 may monitor for a discovery response message (e.g., connection request message 916, discovery response message 918) in a communication resource pool 908 which is part of the sidelink resource pool. Thus, the discovery response message may be a connection establishment request message. The monitoring of the discovery response message may be performed by, e.g., the discovery message monitor component 1444 and/or the reception component 1430 of the apparatus 1402 in FIG. 14.

In one example, the first wireless device may transmit the discovery message in the first portion of the sidelink resource pool and monitor for the discovery response message from the second wireless device in the first portion of the sidelink resource pool, such as described in connection with FIG. 8. For example, the first portion of the sidelink resource pool may further include a broadcast resource pool and a unicast resource pool, where the first wireless device may transmit the discovery message in the broadcast pool and monitor for the discovery response message from the second wireless device in the unicast pool.

In another example, the first wireless device may transmit the discovery message in the first portion of the sidelink resource pool and monitor for the discovery response message from the second wireless device in the second portion of the sidelink resource pool, such as described in connection with FIG. 9. The discovery message may indicate a time window within the second portion of the sidelink resource pool in which the first wireless device monitors for the discovery response message from the second wireless device.

In another example, the first wireless device may indicate at least one of the first wireless device's DRX or DTX information to the second wireless device. Thus, the first wireless device may monitor for the discovery response message from the second wireless device during a DRX active duration or a DTX active duration, such as described in connection with FIG. 10.

In another example, the first wireless device may select the resource for transmitting the discovery message based on a resource sensing and a periodic resource reservation, such as described in connection with FIG. 5.

In another example, the first wireless device may monitor for the discovery response message based on a mapping associated with the resource for the discovery message, such as described in connection with FIGS. 11 and 12.

In another example, the first wireless device may select the resource for transmitting the discovery message based at least in part on one or more parameters associated with the resource and a mapping function, such as described in connection with FIG. 11. The one or more parameters associated with the resource may include at least one of: a sub-channel, an RB, a slot index of PSCCH, a slot index of PSSCH, a source ID associated with the first wireless device, and/or a zone ID associated with the first wireless device, etc.

The discovery message may also indicate a set of resources in which the first wireless device monitors for the discovery response message from the second wireless device, such as described in connection with FIGS. 11 and 12. The set of resources may be within the first portion or the second portion of the sidelink resource pool. In one example, the first wireless device may determine the set of resources based at least in part on a resource sensing procedure, such as described in connection with FIG. 12. In another example, the first wireless device may determine the set of resources based at least in part on a PSCCH or a PSSCH used to transmit the discovery message, such as described in connection with FIG. 11. Thus, the first wireless device may receive the discovery response message or a discovery request message in the set of resources or in a portion of the set of resources.

Figure 14:
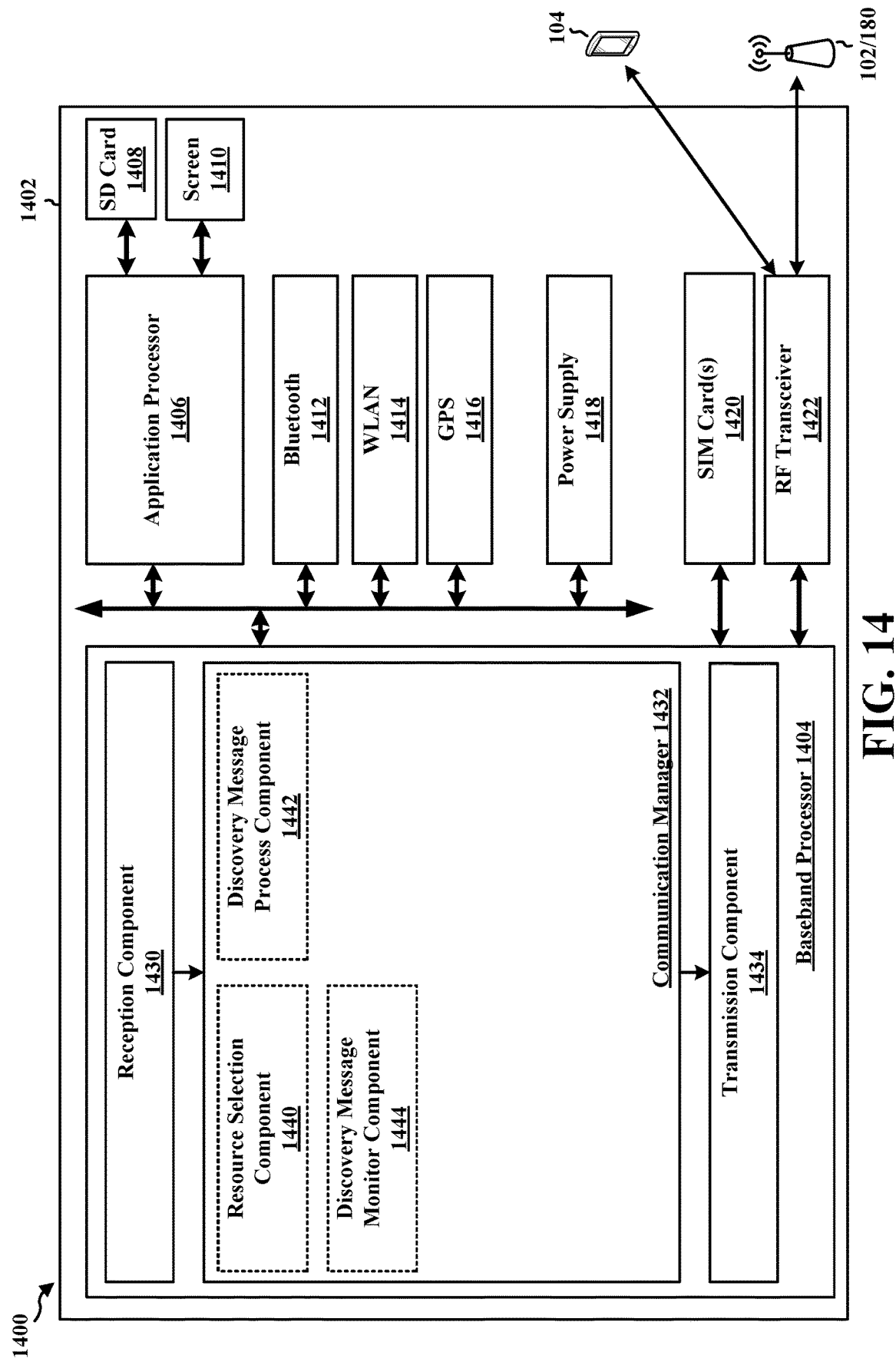
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. The apparatus 1402 may be another device that supports sidelink communication. In some aspects, the apparatus 1402 may include a baseband processor 1404 (also referred to as a modem) coupled to an RF transceiver 1422. In some aspects, the baseband processor 1404 may be a cellular baseband processor, and the RF transceiver 1422 may be a cellular RF transceiver. The apparatus may include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and/or a power supply 1418. The baseband processor 1404 communicates through the RF transceiver 1422 with the UE 104 and/or BS 102/180. The baseband processor 1404 may include a computer-readable medium/memory. The computer-readable medium/memory may be non-transitory. The baseband processor 1404 is responsible for general processing, including the execution of software stored on the computer-readable medium/memory. The software, when executed by the baseband processor 1404, causes the baseband processor 1404 to perform the various functions described supra. The computer-readable medium/memory may also be used for storing data that is manipulated by the baseband processor 1404 when executing software. The baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband processor 1404. The baseband processor 1404 may be a component of the device 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire wireless device (e.g., see 350 of FIG. 3) and include the additional modules of the apparatus 1402.

The communication manager 1432 includes a resource selection component 1440 that is configured to select a resource for a discovery message from a sidelink resource pool that is partitioned into a first portion and a second portion, e.g., as described in connection with 1302 in FIG. 13. The communication manager 1432 further includes a discovery message process component 1442 configured to transmit a discovery message to a second wireless device using the resource selected from the first portion of the sidelink resource pool, e.g., as described in connection with 1304 in FIG. 13. The communication manager 1432 further includes a discovery message monitor component 1444 that is configured to monitor for a discovery response message from the second wireless device in the sidelink resource pool, e.g., as described in connection with 1306 in FIG. 13.

The apparatus may include additional components that perform each of the blocks of the algorithm in the flowchart of FIG. 13. As such, each block in the flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband processor 1404, includes means for selecting a resource for a discovery message from a sidelink resource pool that is partitioned into a first portion and a second portion (e.g., the resource selection component 1440). The apparatus 1402 includes means for transmitting a discovery message to a second wireless device using the resource selected from the first portion of the sidelink resource pool (e.g., the discovery message process component 1442 and/or the transmission component 1434). The apparatus 1402 includes means for monitoring for a discovery response message from the second wireless device in the sidelink resource pool (e.g., the discovery message monitor component 1444 and/or the reception component 1430). The apparatus 1402 may transmit the discovery message periodically. The first portion of the resource pool may be a discovery resource pool and the second portion of the resource pool may be a communication resource pool. In addition, the discovery message may be a discovery announcement message or a discovery solicitation message. The discovery response message may be a connection establishment request message.

In one configuration, one or more parameters configured for the first portion of the resource pool may be different from the second portion of the resource pool. In such configuration, the one or more parameters may include at least one of parameters for a power control or a HARQ feedback.

In one configuration, the discovery message may indicate a time window in which the apparatus 1402 monitors for the discovery response message from the second wireless device.

In one configuration, the apparatus 1402 includes means for transmitting the discovery message in the first portion of the sidelink resource pool and means for monitoring for the discovery response message from the second wireless device in the first portion of the sidelink resource pool. In such configuration, the first portion of the sidelink resource pool may further include a broadcast resource pool and a unicast resource pool, where the apparatus 1402 may include means for transmitting the discovery message in the broadcast pool and means for monitoring for the discovery response message from the second wireless device in the unicast pool.

In another configuration, the apparatus 1402 includes means for transmitting the discovery message in the first portion of the sidelink resource pool and means for monitoring for the discovery response message from the second wireless device in the second portion of the sidelink resource pool. The discovery message may indicate a time window within the second portion of the sidelink resource pool in which the apparatus 1402 monitors for the discovery response message from the second wireless device.

In another configuration, the apparatus 1402 includes means for indicating at least one of the apparatus 1402's DRX or DTX information to the second wireless device. Thus, the apparatus 1402 includes means for monitoring for the discovery response message from the second wireless device during a DRX active duration or a DTX active duration.

In another configuration, the apparatus 1402 includes means for selecting the resource for transmitting the discovery message based on a resource sensing and a periodic resource reservation.

In another configuration, the apparatus 1402 includes means for selecting the resource for transmitting the discovery message based at least in part on one or more parameters associated with the resource and a mapping function. In such configuration, the one or more parameters associated with the resource may include at least one of: a sub-channel, an RB, a slot index of PSCCH, a slot index of PSSCH, a source ID associated with the first wireless device, and/or a zone ID associated with the first wireless device, etc.

The discovery message may also indicate a set of resources in the apparatus 1402 monitors for the discovery response message from the second wireless device. The set of resources may be within the first portion or the second portion of the sidelink resource pool. In one configuration, the apparatus 1402 includes means for determining the set of resources based at least in part on a resource sensing procedure. In another configuration, the apparatus 1402 includes means for determining the set of resources based at least in part on a PSCCH or a PSSCH used to transmit the discovery message. Thus, the apparatus 1402 may also include means for receiving the discovery response message or a discovery request message in the set of resources or in a portion of the set of resources.

The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 15:
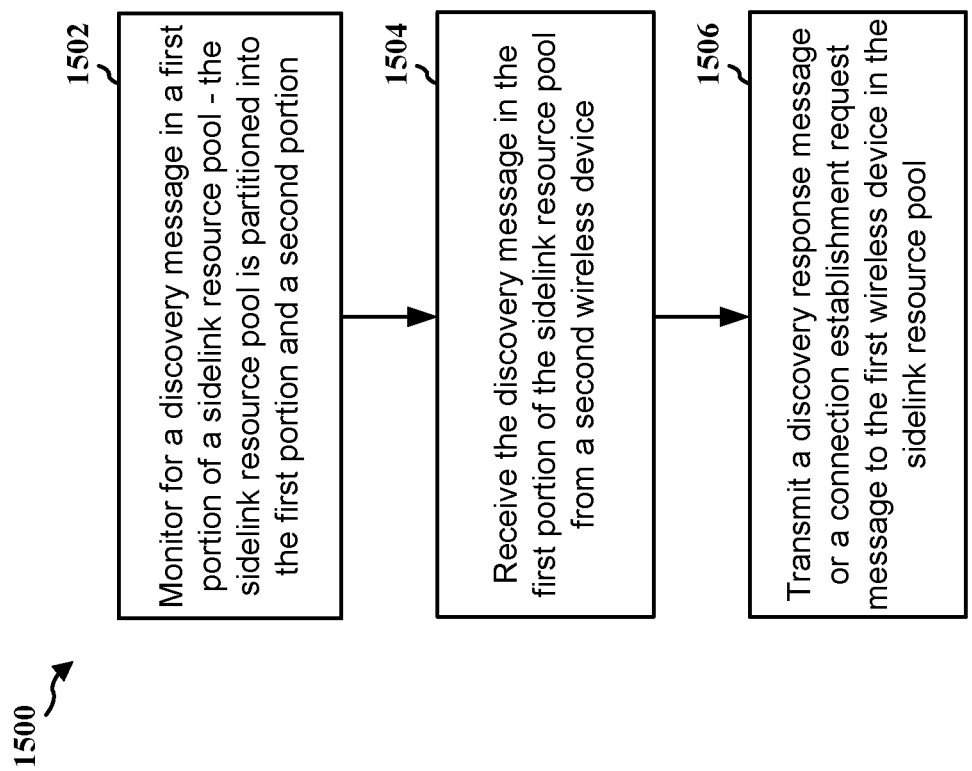
FIG. 15 is a flowchart of a method of wireless communication.

FIG. 15 is a flowchart 1500 of a method of wireless communication. The method may be performed by a first wireless device communicating based on sidelink (e.g., the UE 104, 402, 404, 406, 604, 614, 804, 904, 1004, 1104, 1105, 1204, 1205; the device 310 or 350, the RSU 407; the apparatus 1602). Optional aspects are illustrated with a dashed line. The method may enable the first wireless device to monitor for or to transmit discovery-related messages at specified resources pool(s) and/or time duration.

At 1502, the first wireless device may monitor for a discovery message in a first portion of a sidelink resource pool, where the sidelink resource pool is partitioned into the first portion and a second portion, such as described in connection with FIGS. 7 to 12. For example, the UE 804 or 904 may monitor for a discovery message (e.g., presence announcement message 812/912 or solicitation message 814/914) in the discovery resource pool 806/906, where the discovery resource pool 806/906 is separated from the communication resource pool 820/908. The monitoring of the discovery message may be performed by, e.g., the discovery message monitor component 1640 and/or the reception component 1630 of the apparatus 1602 in FIG. 16.

In one example, the first portion of the resource pool may be a discovery resource pool and the second portion of the resource pool may be a communication resource pool. One or more parameters configured for the first portion of the resource pool may be different from the second portion of the resource pool. For example, the one or more parameters may include at least one of parameters for a power control or a HARQ feedback.

At 1504, the first wireless device may receive the discovery message in the first portion of the sidelink resource pool from a second wireless device, such as described in connection with FIGS. 7 to 12. For example, the UE 804 or 904 may receive presence announcement message 812/912 or solicitation message 814/914 from the resource selected from the discovery resource pool 806/906. The reception of the discovery message may be performed by, e.g., the discovery message process component 1642 and/or the reception component 1630 of the apparatus 1602 in FIG. 16.

In one example, the discovery message may indicate a time window in which the first wireless device may transmit the discovery response message or the connection establishment request message to the second wireless device based at least in part on the time window.

At 1506, the first wireless device may transmit a discovery response message or a connection establishment request message to the first wireless device in the sidelink resource pool, such as described in connection with FIGS. 7 to 12. For example, the UE 804 may transmit a connection request message 816 or a discovery response message 818 in a unicast pool 810 which is part of the sidelink resource pool; the UE 904 may transmit a connection request message 916 or a discovery response message 918 in a communication resource pool 908 which is part of the sidelink resource pool. The first wireless device may select a random OCC for a PSSCH DMRS for transmitting the discovery response message or the connection establishment request message. The transmission of the discovery response message may be performed by, e.g., the discovery message response component 1644 and/or the reception component 1630 of the apparatus 1602 in FIG. 16.

In one example, the first wireless device may receive the discovery message in the first portion of the sidelink resource pool and transmits the discovery response message or the connection establishment request message to the second wireless device in the first portion of the sidelink resource pool, such as described in connection with FIG. 8. For example, the first portion of the sidelink resource pool may further include a broadcast pool and a unicast pool, where the first wireless device may receive the discovery message in the broadcast pool and transmits the discovery response message or the connection establishment request message to the second wireless device in the unicast pool. In addition, the first wireless device may monitor for the discovery message in the broadcast pool and does not monitor for the discovery message in the unicast pool and the second portion of the sidelink resource pool.

In another example, the first wireless device may receive the discovery message in the first portion of the sidelink resource pool and transmits the discovery response message or the connection establishment request message to the second wireless device in the second portion of the sidelink resource pool, such as described in connection with FIG. 9. The discovery message may indicate a time window within the second portion of the sidelink resource pool in which the first wireless device transmits the discovery response message or the connection establishment request message to the second wireless device based at least in part on the time window.

In another example, the first wireless device may receive an indication regarding at least one of the second wireless device's DRX or DTX information from the second wireless device. In response, the first wireless device may transmit the discovery response message or the connection establishment request message to the second wireless device during a DRX active duration or a DTX active duration at the first wireless device, such as described in connection with FIG. 10.

The discovery message may a periodic message from the second wireless device, such as described in connection with FIGS. 11 and 12. In one example, the discovery message may indicate a set of resources (e.g., 1122, 1222) within the second portion of the sidelink resource pool in which the first wireless device transmits the discovery response message or the connection establishment request message to the second wireless device using the set of resources or a portion of the set of resources. In another example, the first wireless device may receive a second discovery message from a third wireless device, where the second discovery message may indicate a set of resources within the second portion of the sidelink resource pool that partially overlaps with the set of resources indicated in the discovery message from the second wireless device. The first wireless device may transmit the discovery response message or the connection establishment request message to the second wireless device or the third wireless device using resources that are not overlapped.

In another example, the first wireless device may determine a resource for transmitting the discovery response message or the connection establishment request message based at least in part on a received PSCCH or a received PSSCH that carries the discovery message, such as described in connection with FIG. 11.

In another example, the first wireless device may determine a resource for transmitting the discovery response message or the connection establishment request message based at least in part on resource sensing procedure.

In another example, the first wireless device may transmit the discovery response message or the connection establishment request message to the second wireless device based on a mapping associated with a resource used for receiving the discovery message, such as described in connection with FIGS. 11 and 12.

Figure 16:
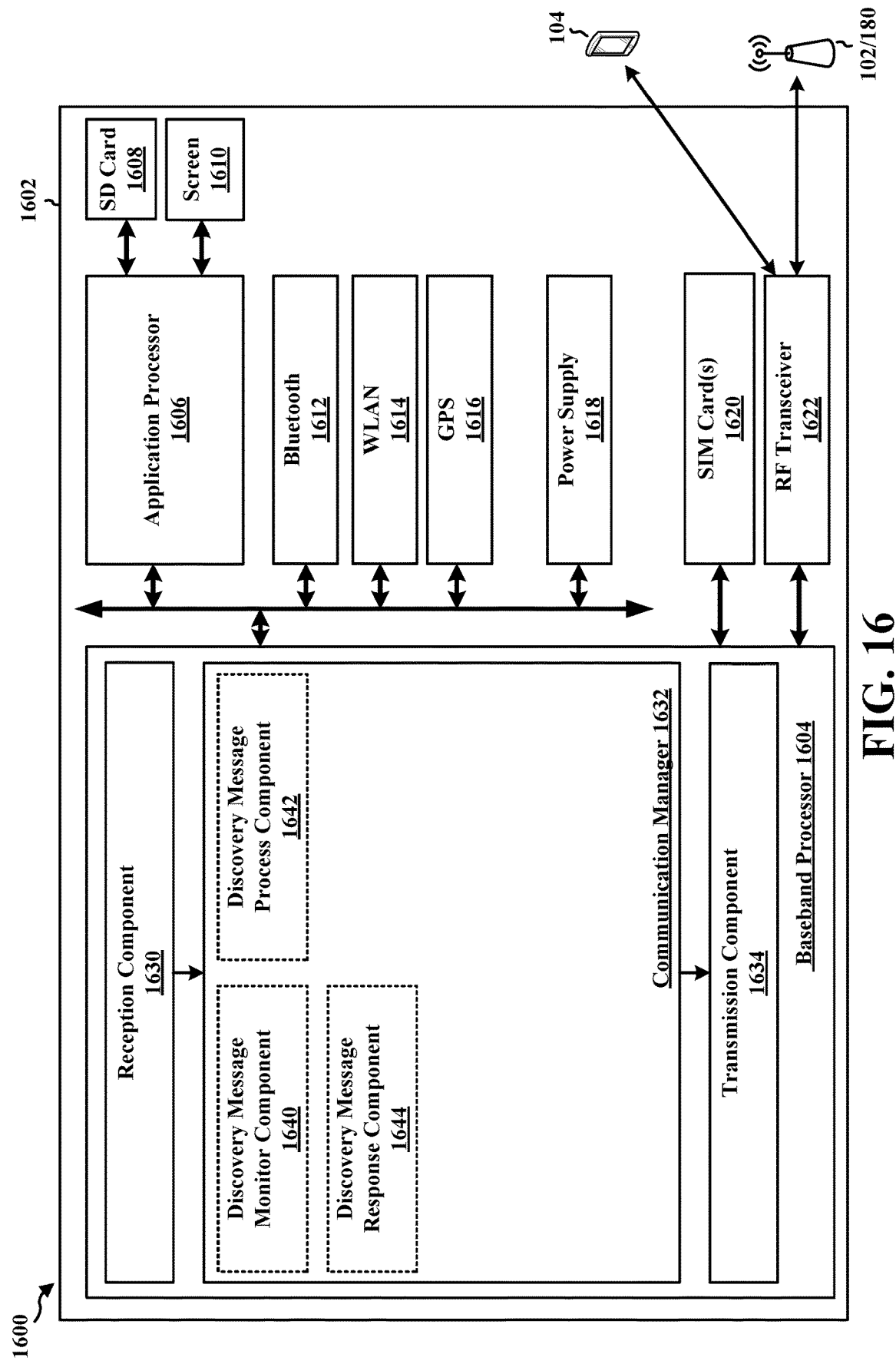
FIG. 16 is a diagram illustrating an example of a hardware implementation for an example apparatus.

FIG. 16 is a diagram 1600 illustrating an example of a hardware implementation for an apparatus 1602. The apparatus 1602 may be a UE, a component of a UE, or may implement UE functionality. The apparatus 1602 may be another device that supports sidelink communication. In some aspects, the apparatus 1602 may include a baseband processor 1604 (also referred to as a modem) coupled to a RF transceiver 1622. In some aspects, the baseband processor 1404 may be a cellular baseband processor, and the RF transceiver 1422 may be a cellular RF transceiver. The apparatus may include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and/or a power supply 1618. The baseband processor 1604 communicates through the RF transceiver 1622 with the UE 104 and/or BS 102/180. The baseband processor 1604 may include a computer-readable medium/memory. The computer-readable medium/memory may be non-transitory. The baseband processor 1604 is responsible for general processing, including the execution of software stored on the computer-readable medium/memory. The software, when executed by the baseband processor 1604, causes the baseband processor 1604 to perform the various functions described supra. The computer-readable medium/memory may also be used for storing data that is manipulated by the baseband processor 1604 when executing software. The baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband processor 1604. The baseband processor 1604 may be a component of the device 350 and may include the memory 360 and/or at least one of the TX processor 368, the RX processor 356, and the controller/processor 359. In one configuration, the apparatus 1602 may be a modem chip and include just the baseband processor 1604, and in another configuration, the apparatus 1602 may be the entire wireless device (e.g., see 350 of FIG. 3) and include the additional modules of the apparatus 1602.

The communication manager 1632 includes a discovery message monitor component 1640 that is configured to monitor for a discovery message in a first portion of a sidelink resource pool, where the sidelink resource pool is partitioned into the first portion and a second portion, e.g., as described in connection with 1502 in FIG. 15. The communication manager 1632 further includes a discovery message process component 1642 configured to receive the discovery message in the first portion of the sidelink resource pool from a second wireless device, e.g., as described in connection with 1504 in FIG. 15. The communication manager 1632 further includes a discovery response component 1644 that is configured to transmit a discovery response message or a connection establishment request message to the first wireless device in the sidelink resource pool, e.g., as described in connection with 1506 in FIG. 15.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband processor 1604, includes means for monitoring for a discovery message in a first portion of a sidelink resource pool, where the sidelink resource pool is partitioned into the first portion and a second portion (e.g., the discovery message monitor component 1640 and/or the reception component 1630). The apparatus 1602 includes means for receiving the discovery message in the first portion of the sidelink resource pool from a second wireless device (e.g., the discovery message process component 1642 and/or the reception component 1630). The apparatus 1602 includes means for transmitting a discovery response message or a connection establishment request message to the first wireless device in the sidelink resource pool (e.g., the discovery message response component 1644 and/or the reception component 1630). The first portion of the resource pool may be a discovery resource pool and the second portion of the resource pool may be a communication resource pool. One or more parameters configured for the first portion of the resource pool may be different from the second portion of the resource pool. For example, the one or more parameters may include at least one of parameters for a power control or a HARQ feedback. The apparatus 1602 may also include means for selecting a random OCC for a PSSCH DMRS for transmitting the discovery response message or the connection establishment request message.

In one configuration, the discovery message may indicate a time window in which the first wireless device may transmit the discovery response message or the connection establishment request message to the second wireless device based at least in part on the time window.

In one configuration, the apparatus 1602 includes means for receiving the discovery message in the first portion of the sidelink resource pool and transmits the discovery response message or the connection establishment request message to the second wireless device in the first portion of the sidelink resource pool. In such configuration, the first portion of the sidelink resource pool may further include a broadcast pool and a unicast pool, where the apparatus 1602 includes means for receiving the discovery message in the broadcast pool and means for transmits the discovery response message or the connection establishment request message to the second wireless device in the unicast pool. In addition, the apparatus 1602 may include means for monitoring for the discovery message in the broadcast pool and does not monitor for the discovery message in the unicast pool and the second portion of the sidelink resource pool.

In another configuration, the apparatus 1602 includes means for receiving the discovery message in the first portion of the sidelink resource pool and means for transmitting the discovery response message or the connection establishment request message to the second wireless device in the second portion of the sidelink resource pool. The discovery message may indicate a time window within the second portion of the sidelink resource pool in which the apparatus 1602 transmits the discovery response message or the connection establishment request message to the second wireless device based at least in part on the time window.

In another configuration, the apparatus 1602 includes means for receiving an indication regarding at least one of the second wireless device's DRX or DTX information from the second wireless device. In such configuration, the apparatus 1602 may include means for transmitting the discovery response message or the connection establishment request message to the second wireless device during a DRX active duration or a DTX active duration at the first wireless device.

The discovery message may a periodic message from the second wireless device. In one configuration, the discovery message may indicate a set of resources within the second portion of the sidelink resource pool in which the apparatus 1602 transmits the discovery response message or the connection establishment request message to the second wireless device using the set of resources or a portion of the set of resources. In another configuration, the apparatus 1602 includes means for receiving a second discovery message from a third wireless device, where the second discovery message may indicate a set of resources within the second portion of the sidelink resource pool that partially overlaps with the set of resources indicated in the discovery message from the second wireless device. In such configuration, the apparatus 1602 includes means for transmitting the discovery response message or the connection establishment request message to the second wireless device or the third wireless device using resources that are not overlapped.

In another configuration, the apparatus 1602 includes means for determining a resource for transmitting the discovery response message or the connection establishment request message based at least in part on a received PSCCH or a received PSSCH that carries the discovery message.

In another configuration, the apparatus 1602 includes means for determining a resource for transmitting the discovery response message or the connection establishment request message based at least in part on resource sensing procedure.

The means may be one or more of the components of the apparatus 1602 configured to perform the functions recited by the means. As described supra, the apparatus 1602 may include the TX Processor 368, the RX Processor 356, and the controller/processor 359. As such, in one configuration, the means may be the TX Processor 368, the RX Processor 356, and the controller/processor 359 configured to perform the functions recited by the means.

Aspects presented herein may improve the resource allocation of sidelink communications and reduce power consumption at a receiving sidelink device and/or at a transmitting sidelink device when the devices are performing sidelink discovery procedures. In one aspect of the present disclosure, a discovery resource pool is separately configured from a communication resource pool for sidelink devices, such that sidelink devices may skip monitoring for certain communication pool if the communication pool does not have any communication messages for the sidelink devices. This may enable power saving for the sidelink devices as the sidelink devices do not monitor the resource pool continuously for communication messages.

The following examples are illustrative only and aspects thereof may be combined with aspects of other examples or teaching described herein, without limitation.

Aspect 1 is a method of wireless communication at a first wireless device, including: selecting a resource for a discovery message from a sidelink resource pool that is partitioned into a first portion and a second portion; transmitting a discovery message to a second wireless device using the resource selected from the first portion of the sidelink resource pool; and monitoring for a discovery response message from the second wireless device in the sidelink resource pool.

In aspect 2, the method of aspect 1 further includes that the discovery message is a discovery announcement message or a discovery solicitation message.

In aspect 3, the method of aspect 1 or aspect 2 further includes that the discovery response message is a connection establishment request message.

In aspect 4, the method of any of aspects 1-3 further includes that the first portion of the sidelink resource pool is a discovery resource pool and the second portion of the sidelink resource pool is a communication resource pool.

In aspect 5, the method of any of aspects 1-4 further includes that one or more parameters configured for the first portion of the resource pool are different from the second portion of the resource pool.

In aspect 6, the method of any of aspects 1-5 further includes that the one or more parameters include at least one of parameters for a power control or a HARQ feedback.

In aspect 7, the method of any of aspects 1-6 further includes that the discovery message indicates a time window in which the first wireless device monitors for the discovery response message from the second wireless device.

In aspect 8, the method of any of aspects 1-7 further includes that the first wireless device transmits the discovery message in the first portion of the sidelink resource pool and monitors for the discovery response message from the second wireless device in the first portion of the sidelink resource pool.

In aspect 9, the method of any of aspects 1-8 further includes that the first portion of the sidelink resource pool further include a broadcast resource pool and a unicast resource pool.

In aspect 10, the method of any of aspects 1-9 further includes that the first wireless device transmits the discovery message in the broadcast resource pool and monitors for the discovery response message from the second wireless device in the unicast resource pool.

In aspect 11, the method of any of aspects 1-10 further includes that the first wireless device transmits the discovery message in the first portion of the sidelink resource pool and monitors for the discovery response message from the second wireless device in the second portion of the sidelink resource pool.

In aspect 12, the method of any of aspects 1-11 further includes that the discovery message indicates a time window within the second portion of the sidelink resource pool in which the first wireless device monitors for the discovery response message from the second wireless device.

In aspect 13, the method of any of aspects 1-12 further includes: indicating at least one of the first wireless device's DRX or DTX information to the second wireless device.

In aspect 14, the method of any of aspects 1-13 further includes that the first wireless device monitors for the discovery response message from the second wireless device during a DRX active duration or a DTX active duration.

In aspect 15, the method of any of aspects 1-14 further includes that the first wireless device transmits the discovery message periodically.

In aspect 16, the method of any of aspects 1-15 further includes that the first wireless device selects the resource for transmitting the discovery message based on a resource sensing and a periodic resource reservation.

In aspect 17, the method of any of aspects 1-16 further includes that the first wireless device selects the resource for transmitting the discovery message based at least in part on one or more parameters associated with the resource and a mapping function.

In aspect 18, the method of any of aspects 1-17 further includes that the one or more parameters associated with the resource include at least one of: a sub-channel, a resource block, a slot index of PSCCH, a slot index of PSSCH, a source ID associated with the first wireless device, or a zone ID associated with the first wireless device.

In aspect 19, the method of any of aspects 1-18 further includes that the discovery message indicates a set of resources in which the first wireless device monitors for the discovery response message from the second wireless device.

In aspect 20, the method of any of aspects 1-19 further includes that the set of resources is within the first portion or the second portion of the sidelink resource pool.

In aspect 21, the method of any of aspects 1-20 further includes that the first wireless device determines the set of resources based at least in part on a resource sensing procedure.

In aspect 22, the method of any of aspects 1-21 further includes that the first wireless device determines the set of resources based at least in part on a PSCCH or a PSSCH used to transmit the discovery message.

In aspect 23, the method of any of aspects 1-22 further includes: receiving the discovery response message or a discovery request message in the set of resources or in a portion of the set of resources.

Aspect 24 is an apparatus for wireless communication of a first wireless device, including: means for selecting a resource for a discovery message from a sidelink resource pool that is partitioned into a first portion and a second portion; means for transmitting a discovery message to a second wireless device using the resource selected from the first portion of the sidelink resource pool; and means for monitoring for a discovery response message from the second wireless device in the sidelink resource pool.

In aspect 25, the apparatus of aspect 24 further includes means to perform the method of any of aspects 2-23.

Aspect 26 is an apparatus for wireless communication of a first wireless device, including: a memory; and at least one processor coupled to the memory, the memory and the at least one processor configured to perform the method of aspects 1-23.

Aspect 27 is a non-transitory computer-readable medium storing computer executable code for wireless communication at a first wireless device, the code when executed by a processor cause the processor to perform the method of any of aspects 1-23.

Aspect 28 is a method of wireless communication at a first wireless device, including: monitoring for a discovery message in a first portion of a sidelink resource pool, where the sidelink resource pool is partitioned into the first portion and a second portion; receiving the discovery message in the first portion of the sidelink resource pool from a second wireless device; and transmitting a discovery response message or a connection establishment request message to the first wireless device in the sidelink resource pool.

In aspect 29, the method of aspect 28 further includes that the discovery message is a discovery announcement message or a discovery solicitation message.

In aspect 30, the method of aspect 28 or aspect 29 further includes that the first portion of the sidelink resource pool is a discovery resource pool and the second portion of the sidelink resource pool is a communication resource pool.

In aspect 31, the method of any of aspects 28-30 further includes that one or more parameters configured for the first portion of the sidelink resource pool is different from the second portion of the sidelink resource pool.

In aspect 32, the method of any of aspects 28-31 further includes that one or more parameters include at least one of parameters for a power control or a HARQ feedback.

In aspect 33, the method of any of aspects 28-32 further includes that the discovery message indicates a time window in which the first wireless device transmits the discovery response message or the connection establishment request message to the second wireless device based at least in part on the time window.

In aspect 34, the method of any of aspects 28-33 further includes that the first wireless device receives the discovery message in the first portion of the sidelink resource pool and transmits the discovery response message or the connection establishment request message to the second wireless device in the first portion of the sidelink resource pool.

In aspect 35, the method of any of aspects 28-34 further includes that the first portion of the sidelink resource pool further include a broadcast resource pool and a unicast resource pool, the first wireless device receives the discovery message in the broadcast resource pool and transmits the discovery response message or the connection establishment request message to the second wireless device in the unicast resource pool.

In aspect 36, the method of any of aspects 28-35 further includes that the first wireless device monitors for the discovery message in the broadcast resource pool and does not monitor for the discovery message in the unicast resource pool and the second portion of the sidelink resource pool.

In aspect 37, the method of any of aspects 28-36 further includes that the first wireless device receives the discovery message in the first portion of the sidelink resource pool and transmits the discovery response message or the connection establishment request message to the second wireless device in the second portion of the sidelink resource pool.

In aspect 38, the method of any of aspects 28-37 further includes that the discovery message indicates a time window within the second portion of the sidelink resource pool in which the first wireless device transmits the discovery response message or the connection establishment request message to the second wireless device based at least in part on the time window.

In aspect 39, the method of any of aspects 28-38 further includes: receiving an indication regarding at least one of the second wireless device's DRX or DTX information from the second wireless device.

In aspect 40, the method of any of aspects 28-39 further includes that the first wireless device transmits the discovery response message or the connection establishment request message to the second wireless device during a DRX active duration or a DTX active duration at the first wireless device.

In aspect 41, the method of any of aspects 28-40 further includes that the discovery message is a periodic message from the second wireless device.

In aspect 42, the method of any of aspects 28-41 further includes that the discovery message indicates a set of resources within the second portion of the sidelink resource pool in which the first wireless device transmits the discovery response message or the connection establishment request message to the second wireless device using the set of resources or a portion of the set of resources.

In aspect 43, the method of any of aspects 28-42 further includes: receiving a second discovery message from a third wireless device, the second discovery message indicates a set of resources within the second portion of the sidelink resource pool that partially overlaps with the set of resources indicated in the discovery message from the second wireless device; and where the first wireless device transmits the discovery response message or the connection establishment request message to the second wireless device or the third wireless device using resources that are not overlapped.

In aspect 44, the method of any of aspects 28-43 further includes: determining a resource for transmitting the discovery response message or the connection establishment request message based at least in part on a received PSCCH or a received PSSCH that carries the discovery message.

In aspect 45, the method of any of aspects 28-44 further includes: determining a resource for transmitting the discovery response message or the connection establishment request message based at least in part on resource sensing procedure.

In aspect 46, the method of any of aspects 28-45 further includes: selecting a random OCC for a PSSCH DMRS for transmitting the discovery response message or the connection establishment request message.

Aspect 47 is an apparatus for wireless communication of a first wireless device, includes: means for monitoring for a discovery message in a first portion of a sidelink resource pool, where the sidelink resource pool is partitioned into the first portion and a second portion; means for receiving the discovery message in the first portion of the sidelink resource pool from a second wireless device; and means for transmitting a discovery response message or a connection establishment request message to the first wireless device in the sidelink resource pool.

In aspect 48, the apparatus of aspect 47 further includes means to perform the method of any of aspects 29-46.

Aspect 49 is an apparatus for wireless communication of a first wireless device, including: a memory; and at least one processor coupled to the memory, the memory and the at least one processor configured to perform the method of aspects 29-46.

Aspect 50 is a non-transitory computer-readable medium storing computer executable code for wireless communication at a first wireless device, the code when executed by a processor cause the processor to perform the method of any of aspects 29-46.

Aspect 51 is an apparatus for wireless communication including at least one processor coupled to a memory and configured to select a resource for a discovery message from a sidelink resource pool that is partitioned into a first portion and a second portion; transmit the discovery message to a second wireless device using the resource selected from the first portion of the sidelink resource pool; and monitor for a discovery response message from the second wireless device in the sidelink resource pool.

Aspect 52 is the apparatus of aspect 51, where the discovery message is a discovery announcement message or a discovery solicitation message, and where the discovery response message is a connection establishment request message.

Aspect 53 is the apparatus of any of aspects 51 and 52, where the first portion of the sidelink resource pool is a discovery resource pool and the second portion of the sidelink resource pool is a communication resource pool.

Aspect 54 is the apparatus of any of aspects 51 to 53, where one or more parameters configured for the first portion of the sidelink resource pool are different from the second portion of the sidelink resource pool, and where the one or more parameters include at least one of parameters for a power control or a hybrid automatic repeat request (HARQ) feedback.

Aspect 55 is the apparatus of any of aspects 51 to 54, where the discovery message indicates a time window in which the first wireless device monitors for the discovery response message from the second wireless device.

Aspect 56 is the apparatus of any of aspects 51 to 55, where the memory and the at least one processor are configured to transmit the discovery message in the first portion of the sidelink resource pool and monitor for the discovery response message from the second wireless device in the first portion of the sidelink resource pool.

Aspect 57 is the apparatus of any of aspects 51 to 56, where the first portion of the sidelink resource pool further includes a broadcast resource pool and a unicast resource pool, and where the memory and the at least one processor are configured to transmit the discovery message in the broadcast resource pool and monitor for the discovery response message from the second wireless device in the unicast resource pool.

Aspect 58 is the apparatus of any of aspects 51 to 57, where the memory and the at least one processor are configured to transmits the discovery message in the first portion of the sidelink resource pool and monitors for the discovery response message from the second wireless device in the second portion of the sidelink resource pool.

Aspect 59 is the apparatus of any of aspects 51 to 58, where the memory and the at least one processor are configured to monitor for the discovery response message based on a mapping associated with the resource selected.

Aspect 60 is the apparatus of any of aspects 51 to 59, where the at least one processor and the memory are further configured to: indicate discontinuous reception (DRX) information for the first wireless device to the second wireless device; and monitor for the discovery response message from the second wireless device during a DRX active duration.

Aspect 61 is the apparatus of any of aspects 51 to 60, where the at least one processor and the memory are further configured to: transmit the discovery message periodically; and select the resource for transmitting the discovery message based on a resource sensing and a periodic resource reservation.

Aspect 62 is the apparatus of any of aspects 51 to 61, where the first wireless device selects the resource for transmitting the discovery message based at least in part on one or more of: a sub-channel, an RB, a PSCCH slot index, a PSSCH slot index, a source ID associated with the first wireless device, or a zone ID associated with the first wireless device.

Aspect 63 is the apparatus of any of aspects 51 to 62, where the discovery message indicates a set of resources in which the first wireless device monitors for the discovery response message from the second wireless device.

Aspect 64 is the apparatus of any of aspects 51 to 63, where the at least one processor and the memory are further configured to: receive the discovery response message or a discovery request message in the set of resources or in a portion of the set of resources.

Aspect 65 is a method of wireless communication for implementing any of aspects 51 to 64.

Aspect 66 is an apparatus for wireless communication including means for implementing any of aspects 51 to 64.

Aspect 67 is a computer-readable medium storing computer executable code, where the code when executed by a processor causes the processor to implement any of aspects 51 to 64.

Aspect 68 is an apparatus for wireless communication including at least one processor coupled to a memory and configured to monitor for a discovery message in a first portion of a sidelink resource pool, where the sidelink resource pool is partitioned into the first portion and a second portion; receive the discovery message in the first portion of the sidelink resource pool from a first wireless device; and transmit a discovery response message or a connection establishment request message to the second wireless device in the sidelink resource pool.

Aspect 69 is the apparatus of aspect 68, where the discovery message is a discovery announcement message or a discovery solicitation message.

Aspect 70 is the apparatus of any of aspects 68 and 69, where the first portion of the sidelink resource pool is a discovery resource pool and the second portion of the sidelink resource pool is a communication resource pool.

Aspect 71 is the apparatus of any of aspects 68 to 70, where one or more parameters configured for the first portion of the sidelink resource pool is different from the second portion of the sidelink resource pool, and where the one or more parameters include at least one of parameters for a power control or a HARQ feedback.

Aspect 72 is the apparatus of any of aspects 68 to 71, where the discovery message indicates a time window in which the second wireless device transmits the discovery response message or the connection establishment request message to the first wireless device based at least in part on the time window.

Aspect 73 is the apparatus of any of aspects 68 to 72, where the at least one processor and the memory are further configured to: receive the discovery message in the first portion of the sidelink resource pool; and transmit the discovery response message or the connection establishment request message to the first wireless device in the first portion of the sidelink resource pool.

Aspect 74 is the apparatus of any of aspects 68 to 73, where the first portion of the sidelink resource pool further include a broadcast resource pool and a unicast resource pool, the at least one processor and the memory are further configured to: receive the discovery message in the broadcast resource pool; and transmit the discovery response message or the connection establishment request message to the first wireless device in the unicast resource pool.

Aspect 75 is the apparatus of any of aspects 68 to 74, where the at least one processor and the memory are further configured to: transmit the discovery response message or the connection establishment request message to the first wireless device based on a mapping associated with a resource used for receiving the discovery message.

Aspect 76 is the apparatus of any of aspects 68 to 75, where the at least one processor and the memory are further configured to: receive, from the first wireless device, an indication regarding DRX information for the first wireless device; and transmit the discovery response message or the connection establishment request message to the first wireless device during a DRX active duration of the first wireless device.

Aspect 77 is the apparatus of any of aspects 68 to 76, where the discovery message is a periodic message from the first wireless device, and where the discovery message indicates a set of resources within the second portion of the sidelink resource pool in which the second wireless device transmits the discovery response message or the connection establishment request message to the first wireless device using the set of resources or a portion of the set of resources.

Aspect 78 is the apparatus of any of aspects 68 to 77, where the discovery message includes a first discovery message and the set of resources includes a first set of resources, the at least one processor and the memory being further configured to: receive a second discovery message from a third wireless device, the second discovery message indicating a second set of resources within the second portion of the sidelink resource pool that partially overlaps with the first set of resources indicated in the discovery message from the first wireless device, wherein the second wireless device transmits the discovery response message or the connection establishment request message to the first wireless device or the third wireless device using resources that are not overlapped.

Aspect 79 is the apparatus of any of aspects 68 to 78, where the at least one processor and the memory are further configured to: select a resource for transmitting the discovery response message or the connection establishment request message based at least in part on a received PSCCH, a received PSSCH that carries the discovery message.

Aspect 80 is the apparatus of any of aspects 68 to 79, where the at least one processor and the memory are further configured to: select a resource for transmitting the discovery response message or the connection establishment request message based at least in part on resource sensing procedure.

Aspect 81 is the apparatus of any of aspects 68 to 80, where the at least one processor and the memory are further configured to: select a random orthogonal cover code for a PSSCH DMRS for transmitting the discovery response message or the connection establishment request message.

Aspect 82 is a method of wireless communication for implementing any of aspects 68 to 81.

Aspect 83 is an apparatus for wireless communication including means for implementing any of aspects 68 to 81.

Aspect 84 is a computer-readable medium storing computer executable code, where the code when executed by a processor causes the processor to implement any of aspects 68 to 81.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a first wireless device, comprising:
   memory; and
   at least one processor coupled to the memory and configured to:
      select a resource for a discovery message from a sidelink resource pool that is partitioned into a first portion that is configured for broadcast or groupcast messages and a second portion that is configured for unicast messages;

broadcast or groupcast the discovery message to a set of second wireless devices using the resource selected from the first portion of the sidelink resource pool; and receive, from a second wireless device in the set of second wireless devices based on the discovery message, a discovery response message in the second portion of the sidelink resource pool.

2. The apparatus of claim 1, wherein the discovery message is a discovery announcement message or a discovery solicitation message, and wherein the discovery response message is a connection establishment request message.

3. The apparatus of claim 1, wherein the first portion of the sidelink resource pool is a discovery resource pool and the second portion of the sidelink resource pool is a communication resource pool.

4. The apparatus of claim 1, wherein one or more parameters configured for the first portion of the sidelink resource pool are different from the second portion of the sidelink resource pool, and wherein the one or more parameters include at least one of parameters for a power control or a hybrid automatic repeat request (HARQ) feedback.

5. The apparatus of claim 1, wherein the discovery message indicates a time window for the first wireless device to monitor for and receive the discovery response message from the second wireless device.

6. The apparatus of claim 1, wherein to receive the discovery response message in the second portion of the sidelink resource pool, the at least one processor is configured to monitor for the discovery response message from the second wireless device in the second portion of the sidelink resource pool.

7. The apparatus of claim 1, wherein the at least one processor is configured to skip monitoring the first portion of the sidelink resource pool for the discovery response message and skip monitoring the second portion of the sidelink resource pool for discovery-related broadcast or groupcast messages.

8. The apparatus of claim 1, wherein the broadcast or groupcast messages and the unicast messages are associated with a mapping that maps a first set of resources for transmitting the broadcast or groupcast messages to a second set of resources for receiving the unicast messages.

9. The apparatus of claim 8, wherein to receive the discovery response message the at least one processor is configured to receive the discovery response message based on the mapping.

10. The apparatus of claim 1, wherein the at least one processor is further configured to:
indicate discontinuous reception (DRX) information for the first wireless device to the second wireless device; and
monitor for the discovery response message from the second wireless device during a DRX active duration.

11. The apparatus of claim 1, wherein the at least one processor is further configured to:
transmit the discovery message periodically; and
select the resource for transmitting the discovery message based on a resource sensing and a periodic resource reservation.

12. The apparatus of claim 11, wherein the first wireless device selects the resource for transmitting the discovery message based at least in part on one or more of:
a sub-channel,
a resource block (RB),
a physical sidelink control channel (PSCCH) slot index,
a physical sidelink shared channel (PSSCH) slot index,
a source ID associated with the first wireless device, or
a zone ID associated with the first wireless device.

13. The apparatus of claim 1, wherein the discovery message indicates a set of resources for the first wireless device to monitor for and receive the discovery response message from the second wireless device.

14. The apparatus of claim 13, wherein the at least one processor is further configured to:
receive the discovery response message or a discovery request message in the set of resources or in a portion of the set of resources.

15. A method of wireless communication at a first wireless device, comprising:
selecting a resource for a discovery message from a sidelink resource pool that is partitioned into a first portion that is configured for broadcast or groupcast messages and a second portion that is configured for unicast messages;
broadcast or groupcast the discovery message to a set of second wireless devices using the resource selected from the first portion of the sidelink resource pool; and
receive, from a second wireless device in the set of second wireless devices based on the discovery message, a discovery response message in the second portion of the sidelink resource pool.

16. An apparatus for wireless communication at a second wireless device, comprising:
memory; and
at least one processor coupled to the memory and configured to:
monitor for a broadcasted or groupcasted discovery message in a first portion of a sidelink resource pool, wherein the sidelink resource pool is partitioned into the first portion that is configured for broadcast or groupcast messages and a second portion that is configured for unicast messages;
receive the broadcasted or groupcasted discovery message in the first portion of the sidelink resource pool from a first wireless device; and
transmit a discovery response message or a connection establishment request message to the first wireless device in the second portion of the sidelink resource pool.

17. The apparatus of claim 16, wherein the broadcasted or groupcasted discovery message is a discovery announcement message or a discovery solicitation message.

18. The apparatus of claim 16, wherein the first portion of the sidelink resource pool is a discovery resource pool and the second portion of the sidelink resource pool is a communication resource pool.

19. The apparatus of claim 16, wherein one or more parameters configured for the first portion of the sidelink resource pool is different from the second portion of the sidelink resource pool, and wherein the one or more parameters include at least one of parameters for a power control or a hybrid automatic repeat request (HARQ) feedback.

20. The apparatus of claim 16, wherein the broadcasted or groupcasted discovery message indicates a time window, and wherein to transmit the discovery response message the at least one processor is configured to transmit the discovery response message or the connection establishment request message to the first wireless device based at least in part on the time window.

21. The apparatus of claim 16, wherein the at least one processor is further configured to:

skip monitoring for a unicast message in the first portion of the sidelink resource pool and skip monitoring for discovery-related broadcast or groupcast messages in the second portion of the sidelink resource pool.

22. The apparatus of claim 16, wherein the broadcast or groupcast messages and the unicast messages are associated with a mapping that maps a first set of resources for transmitting the broadcast or groupcast messages to a second set of resources for receiving the unicast messages.

23. The apparatus of claim 22, wherein to transmit the discovery response message or the connection establishment request message the at least one processor is configured to:
transmit the discovery response message or the connection establishment request message based on the mapping.

24. The apparatus of claim 16, wherein the at least one processor is further configured to:
receive, from the first wireless device, an indication regarding discontinuous reception (DRX) information for the first wireless device; and
transmit the discovery response message or the connection establishment request message to the first wireless device during a DRX active duration of the first wireless device.

25. The apparatus of claim 16, wherein the broadcasted or groupcasted discovery message indicates a set of resources within the second portion of the sidelink resource pool in which the second wireless device transmits the discovery response message or the connection establishment request message to the first wireless device using the set of resources or a portion of the set of resources.

26. The apparatus of claim 25, wherein the broadcasted or groupcasted discovery message comprises a first discovery message and the set of resources comprises a first set of resources, and wherein the at least one processor is further configured to:
receive a second discovery message from a third wireless device, the second discovery message indicating a second set of resources within the second portion of the sidelink resource pool that partially overlaps with the first set of resources indicated in the first discovery message from the first wireless device, wherein the second wireless device transmits the discovery response message or the connection establishment request message to the first wireless device or the third wireless device using resources that are not overlapped.

27. The apparatus of claim 23, wherein the at least one processor is further configured to:
select a resource for transmitting the discovery response message or the connection establishment request message based at least in part on a received physical sidelink control channel (PSCCH), a received physical sidelink shared channel (PSSCH) that carries the broadcasted or groupcasted discovery message.

28. The apparatus of claim 23, wherein the at least one processor is further configured to:
select a resource for transmitting the discovery response message or the connection establishment request message based at least in part on resource sensing procedure.

29. The apparatus of claim 23, wherein the at least one processor is further configured to:
select a random orthogonal cover code (OCC) for a physical sidelink shared channel (PSSCH) demodulation reference signal (DMRS) for transmitting the discovery response message or the connection establishment request message.

30. A method of wireless communication at a second wireless device, comprising:
monitoring for a broadcasted or groupcasted discovery message in a first portion of a sidelink resource pool, wherein the sidelink resource pool is partitioned into the first portion that is configured for broadcast or groupcast messages and a second portion that is configured for unicast messages;
receiving the broadcasted or groupcasted discovery message in the first portion of the sidelink resource pool from a first wireless device; and
transmitting a discovery response message or a connection establishment request message to the second wireless device in the second portion of the sidelink resource pool.

* * * * *